(12) United States Patent
Obe et al.

(10) Patent No.: US 7,575,081 B2
(45) Date of Patent: Aug. 18, 2009

(54) WORK VEHICLE

(75) Inventors: Mitsuhiko Obe, Izumiotsu (JP); Akihiro Asada, Kawachinagano (JP); Takashi Kobayashi, Sakai (JP)

(73) Assignee: Kubota Corporation, Osaka (JP)

( * ) Notice: Subject to any disclaimer, the term of this patent is extended or adjusted under 35 U.S.C. 154(b) by 396 days.

(21) Appl. No.: 10/944,435

(22) Filed: Sep. 17, 2004

(65) Prior Publication Data
US 2005/0211487 A1   Sep. 29, 2005

(30) Foreign Application Priority Data

| Mar. 29, 2004 | (JP) | ............................. 2004-096720 |
| May 31, 2004 | (JP) | ............................. 2004-162272 |
| May 31, 2004 | (JP) | ............................. 2004-162273 |

(51) Int. Cl.
*B60K 5/02* (2006.01)
(52) U.S. Cl. ..................................... 180/68.1; 180/68.4
(58) Field of Classification Search ................ 180/69.2, 180/69.21, 69.22, 69.24, 68.3, 68.4, 89.17
See application file for complete search history.

(56) References Cited

U.S. PATENT DOCUMENTS

| 1,156,017 | A | * | 10/1915 | Livingston | ................. 180/69.2 |
| 1,911,600 | A | * | 5/1933 | Bobertz, Jr. et al. | ......... 180/69.2 |
| 2,059,626 | A | * | 11/1936 | Edwards | .................... 180/69.2 |
| 2,127,321 | A | * | 8/1938 | Barnett | ...................... 180/69.2 |
| 2,197,503 | A | * | 4/1940 | Martin | .................... 123/198 E |
| 2,711,341 | A | * | 6/1955 | Mills et al. | ............. 296/203.01 |
| 3,067,829 | A | * | 12/1962 | Klemm | ...................... 180/68.1 |
| 3,762,489 | A | * | 10/1973 | Proksch et al. | ............. 180/68.1 |
| 3,921,603 | A | * | 11/1975 | Bentz et al. | .............. 123/41.33 |
| 4,020,900 | A | * | 5/1977 | Kitagawa | ................... 165/135 |
| 4,071,009 | A | * | 1/1978 | Kraina | ..................... 123/198 E |
| 4,081,050 | A | * | 3/1978 | Hennessey et al. | ........... 180/233 |
| 4,969,533 | A | * | 11/1990 | Holm et al. | .................. 180/273 |
| 5,036,931 | A | | 8/1991 | Iritani | |
| 5,215,157 | A | * | 6/1993 | Teich | ....................... 180/69.24 |
| 5,490,574 | A | | 2/1996 | Ishiizumi et al. | |
| 5,495,910 | A | | 3/1996 | Stauffer et al. | |
| 5,678,648 | A | * | 10/1997 | Imanishi et al. | ............. 180/68.1 |
| 6,202,777 | B1 | | 3/2001 | Surridge | |
| 6,655,486 | B2 | * | 12/2003 | Oshikawa et al. | ........... 180/68.1 |
| 2004/0216934 | A1 | | 11/2004 | Tomiyama et al. | |

FOREIGN PATENT DOCUMENTS

EP          0 761 941          3/1997

(Continued)

*Primary Examiner*—Christopher P Ellis
*Assistant Examiner*—Bridget Avery
(74) *Attorney, Agent, or Firm*—The Webb Law Firm

(57) ABSTRACT

A work vehicle includes a traveling vehicle body and a hood provided at a front portion of the vehicle body for covering an engine room. The hood includes a front face having a plurality of first air vent holes and right and left side faces each having a plurality of second air vent holes. A radiator is mounted inside the hood, ambient air being drawn in through the first and second air vent holes toward the radiator. A vent hole area ratio of each side face of the hood determined by the second air vent holes is set smaller than a vent hole area ratio of the front face of the hood determined by the first air vent holes.

11 Claims, 32 Drawing Sheets

FOREIGN PATENT DOCUMENTS

| | | |
|---|---|---|
| JP | 59-105025 | 7/1984 |
| JP | 11 091370 | 4/1999 |
| JP | 2002-079956 | 3/2002 |
| JP | 2002-079957 | 3/2002 |
| JP | 2002-192961 | 7/2002 |

* cited by examiner

WORK VEHICLE

BACKGROUND OF THE INVENTION

1. Field of the Invention

The present invention relates to a work vehicle such as an agricultural tractor, more particularly to a work vehicle having a hood provided at a front portion of a vehicle body for covering an engine room.

2. Description of the Related Art

With some work vehicles such as tractors, a radiator is provided inside a hood and this hood includes a number of air vent holes in its right and left side faces and its front face, so that ambient air may be introduced from the right and left side faces and the front face toward the radiator. In the case of a conventional hood construction of this type, a vent hole area ratio (a ratio of vent forming area relative to a unit area of the total air vent hole forming portion) is fixedly set the same for each side face and the front face of the hood. That is, air vent holes of a same size are formed in the right and left side faces and the front face of the hood and also their disposing densities (the number of air vent holes per unit area) are fixedly the same (see e.g. Japanese Patent Application "Kokai" No. 2002-192961).

However, the radiator provided inside the hood is located close to the right and left side faces of the hood, but located far from the front face of the hood. Hence, there develops an air suction force difference between each side face and the front face of the hood, the air drawing force through the vent holes of the side face being greater than the air drawing force through the vent holes of the front face. This tends to result in clogging of the air vent holes of the side faces of the hood with various foreign objects such as grass, bugs, etc., As a result, there occurs shortage of cooling air to e.g. the engine inside the hood, which leads to such trouble as overheating of the engine, cooling problem of the air conditioner, etc.

SUMMARY OF THE INVENTION

In view of the above-described problem of the convention, a primary object of the present invention is to provide a work vehicle which can effectively restrict occurrence of clogging of the air vent holes in the side faces of the hood.

For accomplishing the above-noted object, according to the present invention, there is proposed a work vehicle comprising:

a traveling vehicle body;

a hood provided at a front portion of the vehicle body for covering an engine room, the hood including a front face having a plurality of first air vent holes and right and left side faces each having a plurality of second air vent holes; and a radiator mounted inside the hood, ambient air being drawn in through the first and second air vent holes toward the radiator;

wherein a vent hole area ratio of each side face of the hood determined by the second air vent holes is set smaller than a vent hole area ratio of the front face of the hood determined by the first air vent holes.

According to the above construction, by providing a difference between the two vent hole area ratios, the force drawing ambient air from each side face of the hood approximates the force drawing ambient air from the front face. Therefore, the velocity of the ambient air drawn from the right and left side faces of the hood and that from the front face of the hood are substantially equated with each other, so that the velocity of the ambient air drawn in from the lateral sides of the hood may be lower than the conventional construction. As a result, it is possible to effectively prevent clogging of the air vent holes in the side faces of the hood with foreign objects such as grass, bugs, dust, etc., thus preventing such trouble as overheating of the engine, cooling problem or insufficient cooling of the air conditioner, etc.

In order to realize the difference between the two air vent hole area ratios, according to one preferred embodiment of the invention, a disposing density of the second air vent holes in each side face is set smaller than a disposing density of the first air vent holes in the front face. According to another preferred embodiment, each first air vent hole is formed smaller than the second air vent hole.

According to a further embodiment of the present invention, the first air vent holes are formed in a first grill member attached to the front face and the second air vent holes are formed in a second grill member attached to each side face. In the case of this construction, each grill member can be a metal mesh, a punching metal, a porous synthetic resin plate, etc. With this, the air vent holes having a desired air vent hole area ratio can be formed relatively easily and inexpensively.

Preferably, at least one air cooling auxiliary unit is disposed adjacent the front face of the radiator and a pair of right and left baffle members are disposed adjacent the right and left side faces of the radiator for directing ambient air drawn in from the opposed sides of the radiator toward the air cooling auxiliary unit.

With this construction, air flow coming from the lateral side space of the engine room to enter the radiator is regulated by the baffle members, whereas air can smoothly enter from the front side of the radiator. Therefore, this construction promotes equalization between the velocities of the ambient air drawn from the right and left side faces and from the front face of the hood, thus can prevent clogging of the air vent holes in the side faces of the hood even more effectively.

Also, in the case of the conventional hood construction described hereinbefore, due to shortage of the amount of air drawn from the front of the radiator, cooling of the air cooling auxiliary unit such as a condenser, an oil cooler, an intercooler, may not be effected sufficiently. On the other hand, in the case of the above-described construction proposed by the present invention, the baffle members reduce the velocity of the air coming into the radiator from the lateral sides thereof, so that this air is caused to take detour to the front side of the baffle member. Then, by drawing in this detoured air from the front side of the radiator, the cooling effect of the air cooling auxiliary unit can be enhanced. Therefore, this construction can further effectively prevent shortage of cooling air supplied to e.g. the engine inside the hood, and prevent eventual trouble of overheating of the engine, cooling failure of the air conditioner.

In addition to the above-described construction, at least one of the pair of baffle members can be attached to a front axle frame of the vehicle body to be pivotally opened/closed about a vertical axis. With this, by pivoting the one openable/closable baffle member to the open position, maintenance of the inside of the engine room can be easily carried out. Alternatively, at least one of the pair of baffle members can be adapted to be withdrawable in the right/left direction of the vehicle body. In this case too, by withdrawing this one baffle member, maintenance of the inside of the engine room can be easily carried out.

According to one preferred embodiment of the present invention, the air cooling auxiliary unit includes a pressing portion for pressing, from the outside, a vertically intermediate portion of a free end of the openable/closable baffle member.

According to another preferred embodiment of the present invention, between the openable/closable baffle member and the front axle frame, there is provided a closed position fixing means for supporting the front end of the openable/closable baffle member at its closed position. This closed position fixing means can include an engaging member projecting upwardly of the front axle frame and a clip member provided in the baffle member and engageable with the engaging member.

Further and other features and advantages of the present invention will become apparent upon reading following detailed description of the preferred embodiments thereof with reference to the accompanying drawings.

DESCRIPTION OF THE PREFERRED EMBODIMENTS

Next, preferred embodiments of the present invention will be described with reference to the accompanying drawings. In the following discussion, the traveling direction of a work vehicle will be referred to as the fore and aft direction and a direction normal thereto will be referred to as the right/left direction (the depth direction of the plane of FIG. 1), respectively.

First Embodiment

Figure 1:
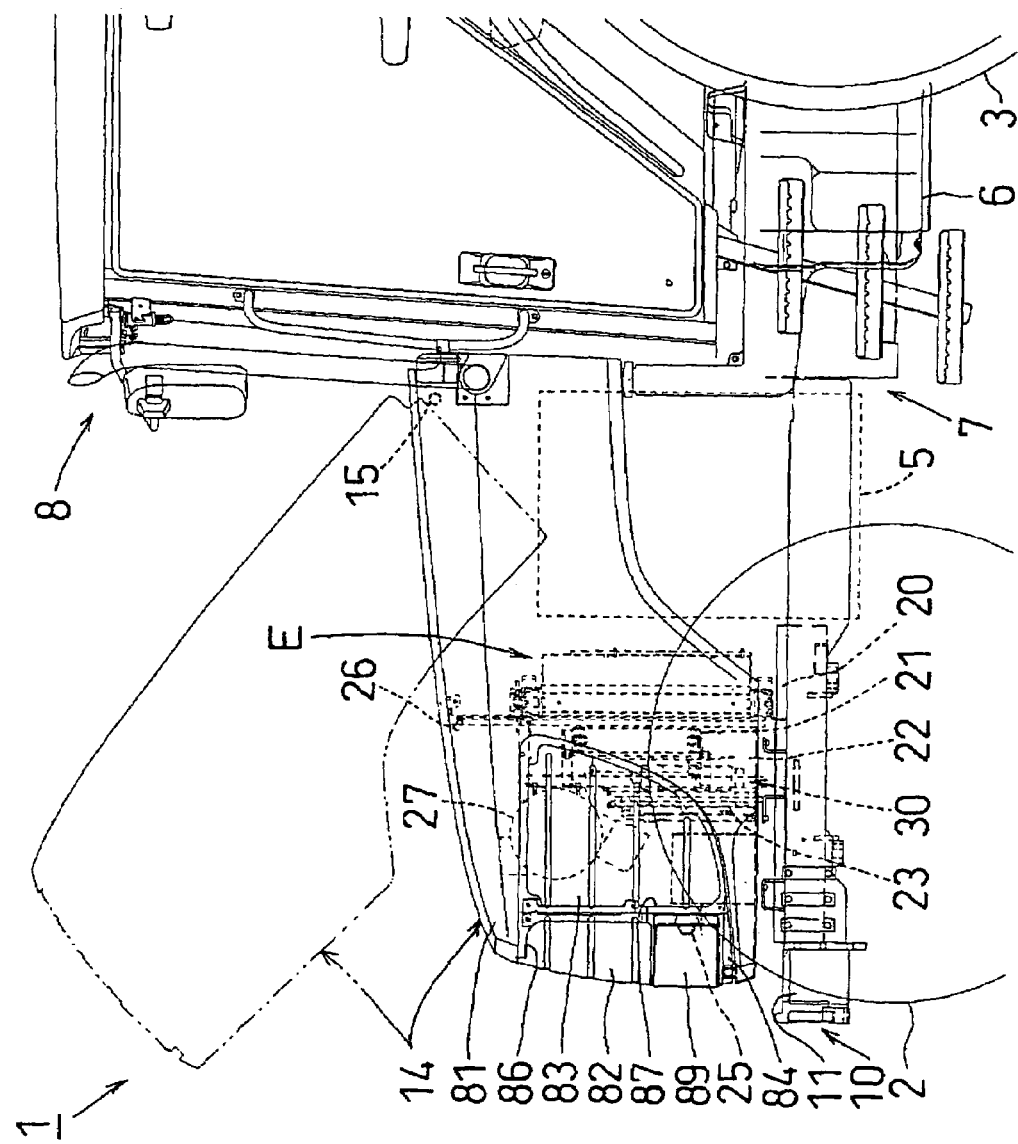
FIG. 1 is a left side schematic view of a work vehicle relating to a first embodiment of the invention, showing a front portion of a tractor as an example of the work vehicle.

In FIG. 1, a tractor 1, as an example of work vehicle, includes a pair of right and left front wheels 2 used for steering and auxiliary traveling drive, and a pair of right and left rear wheels 3 used for main traveling drive. The tractor 1 is driven by a drive force transmitted from an engine 5. Further, this tractor 1 can be switched over between a two-wheel drive mode (rear wheel drive) and four-wheel drive mode (front and rear wheels drive) by means of switching means. The engine 5, a transmission case 6 etc. together constitute a traveling vehicle body 7, which mounts, at a rear portion thereof, an independent mount type cabin 8 including a driver's seat and a driving section.

The traveling vehicle body 7 mounts, at a front portion thereof, the engine 5 and a front axle frame 10 supporting axles of the right and left front wheels 2. An upper portion of the front axle frame 10 is covered with a hood 14 formed of a metal plate or resin shaped like a box. With this, forwardly of the cabin 8, there is formed an engine room E covered with the hood 14.

Figure 6:
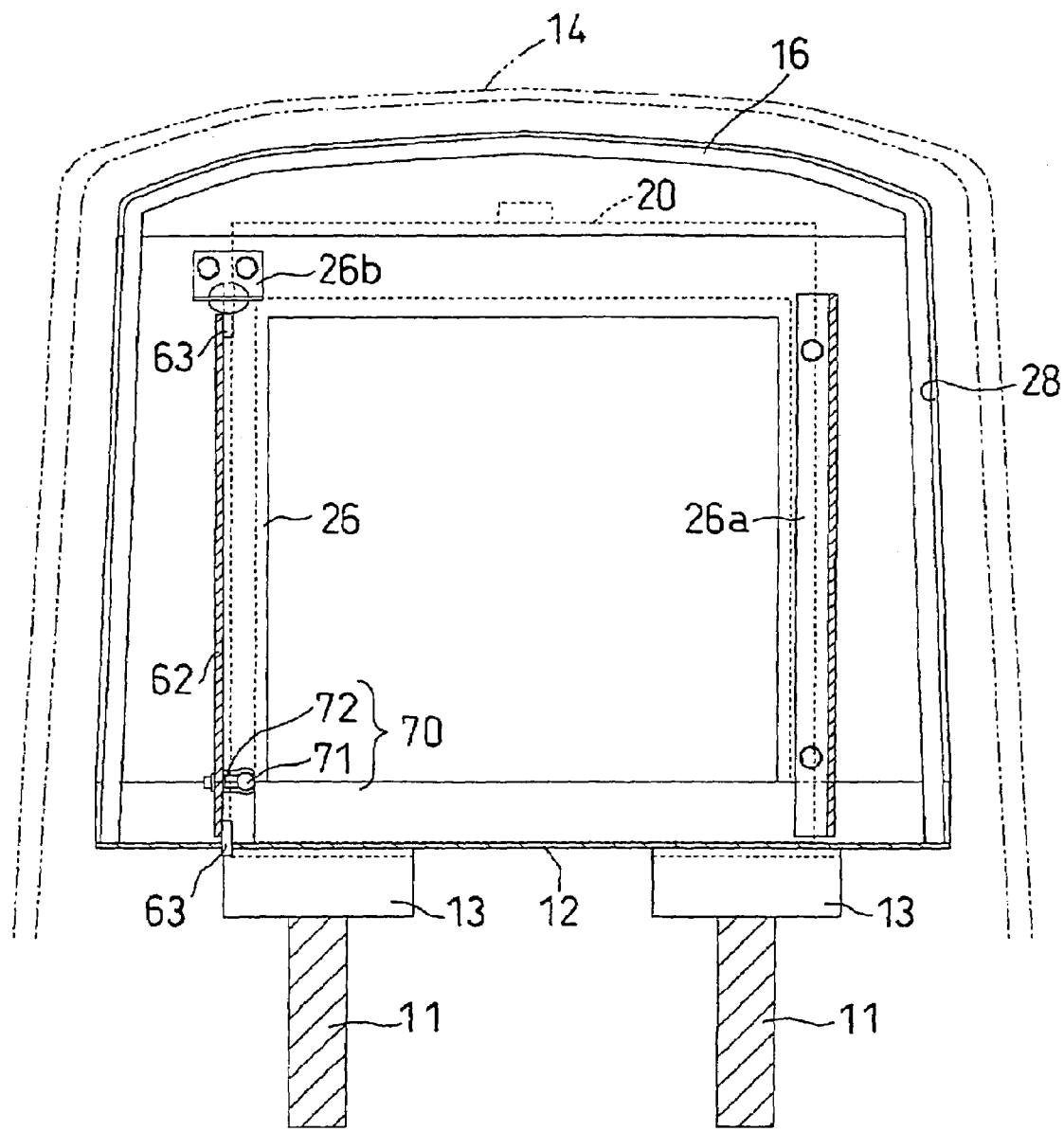
FIG. 6 is a front schematic view showing vicinity of a partitioning frame.
Figure 7:
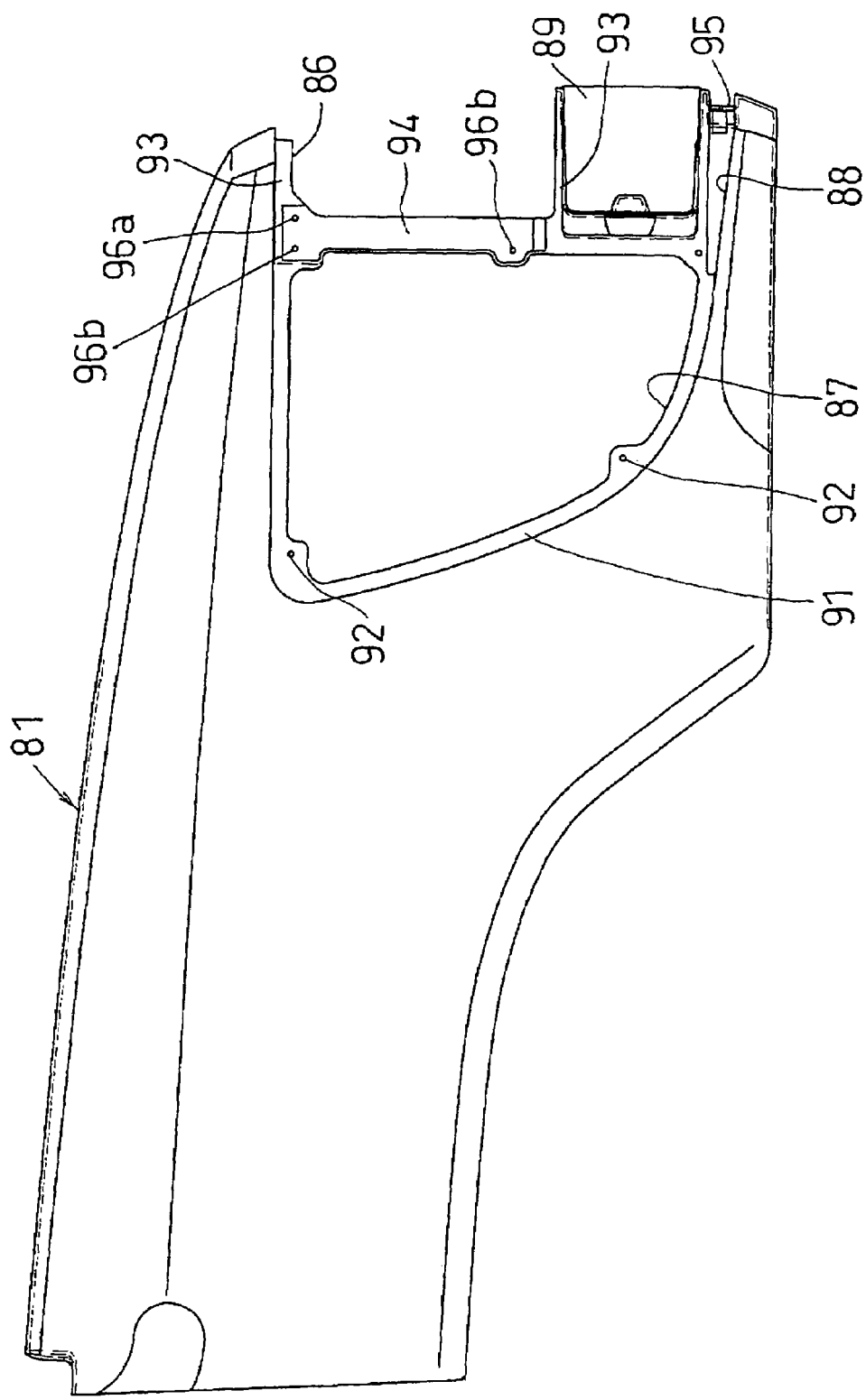
FIG. 7 is a side view of a hood body.
Figure 8:
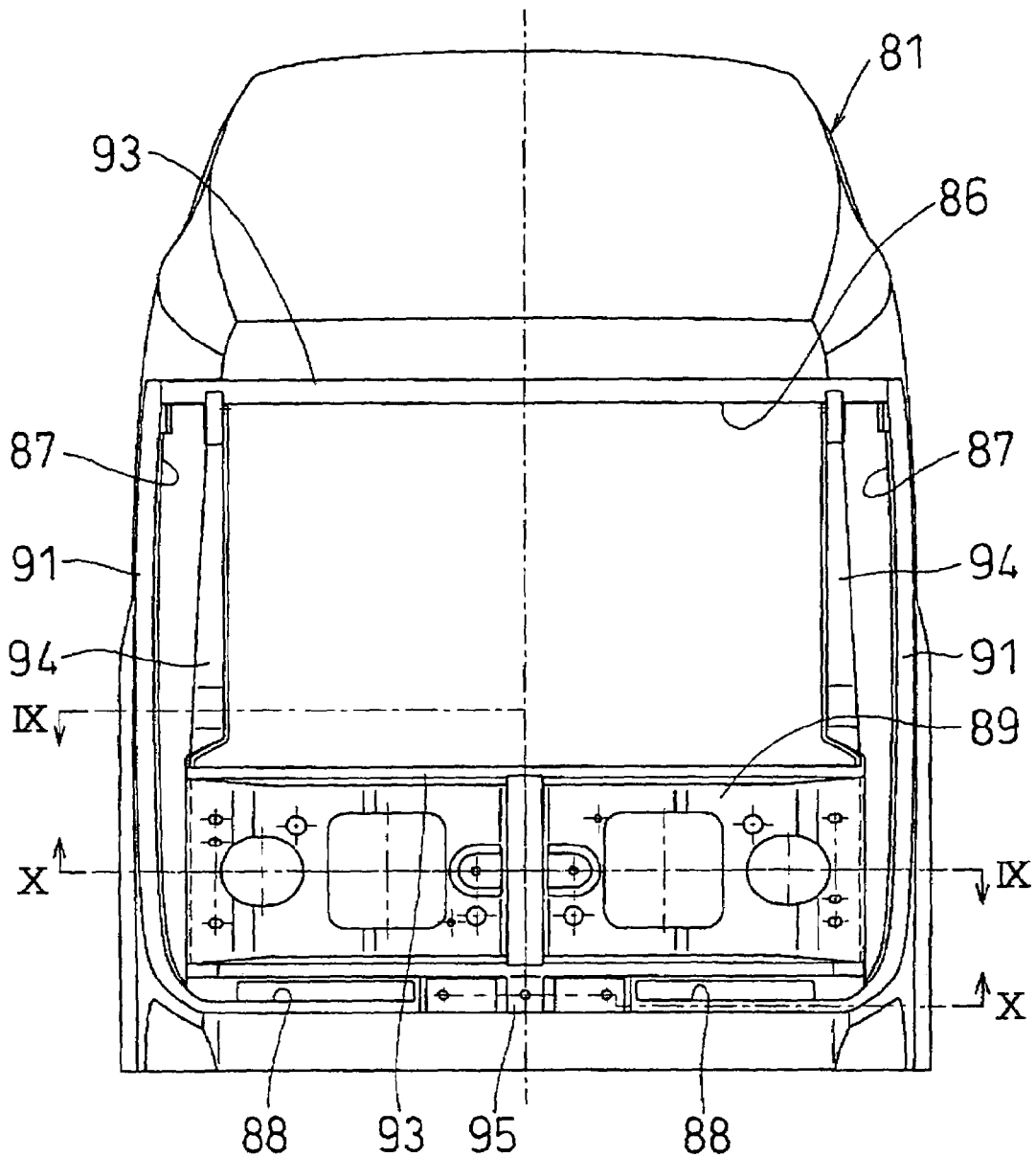
FIG. 8 is a front view of the hood body.
Figure 9:
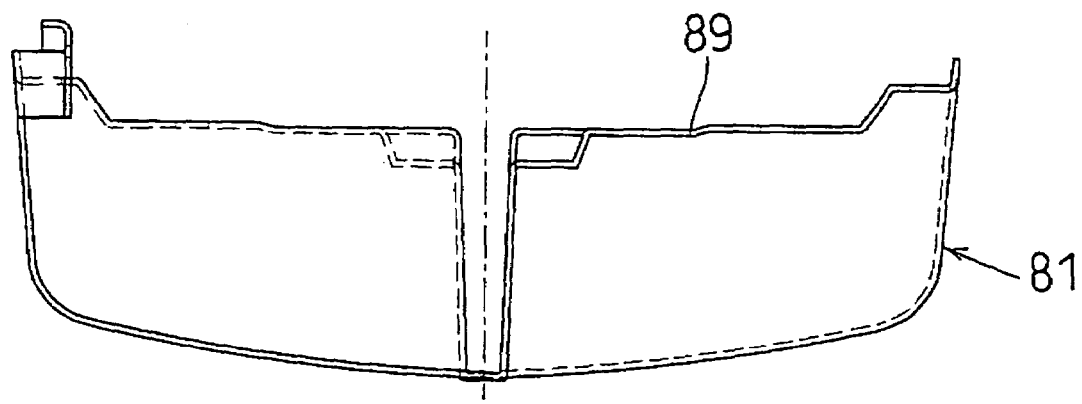
FIG. 9 is a section view taken alone a line IX-IX in FIG. 8.
Figure 10:
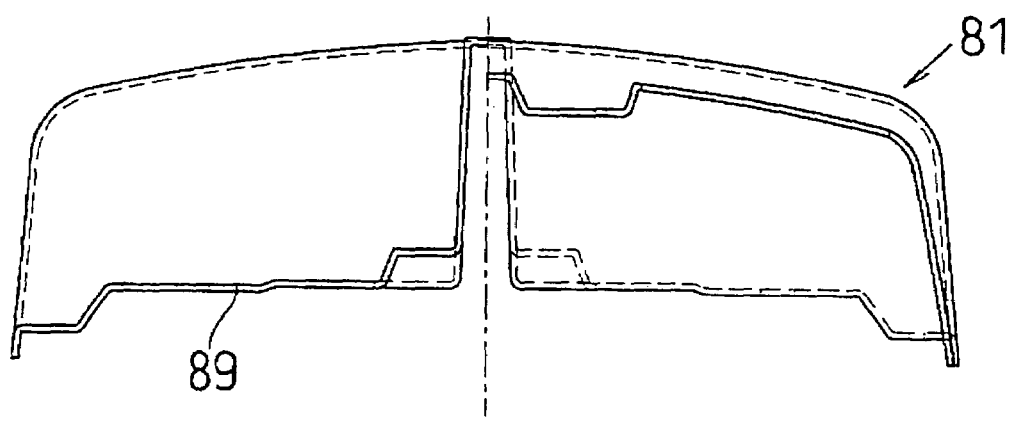
FIG. 10 is a section view taken along a line X-X in FIG. 8.
Figure 11:
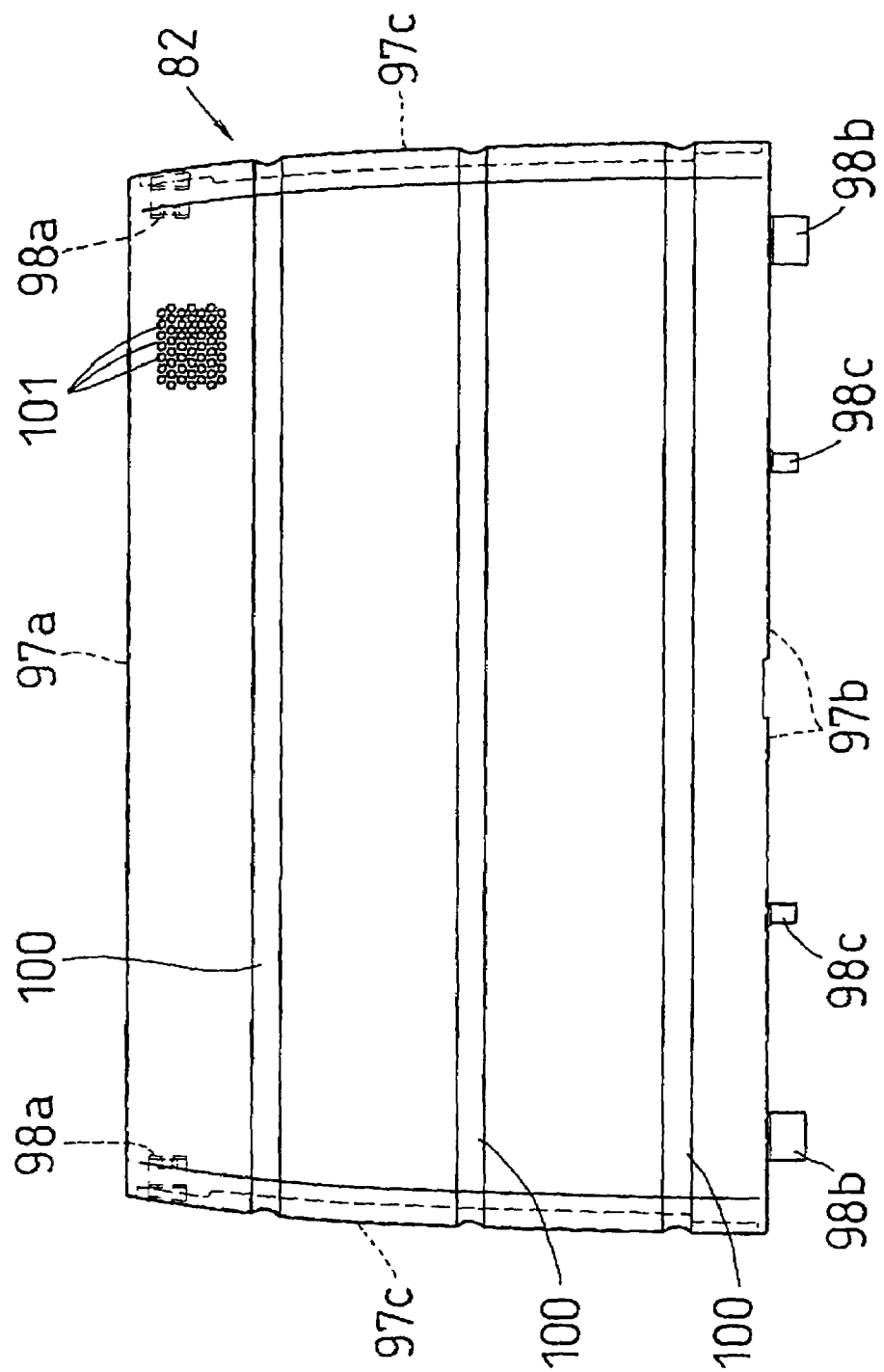
FIG. 11 is front view of a front grill member.
Figure 12:
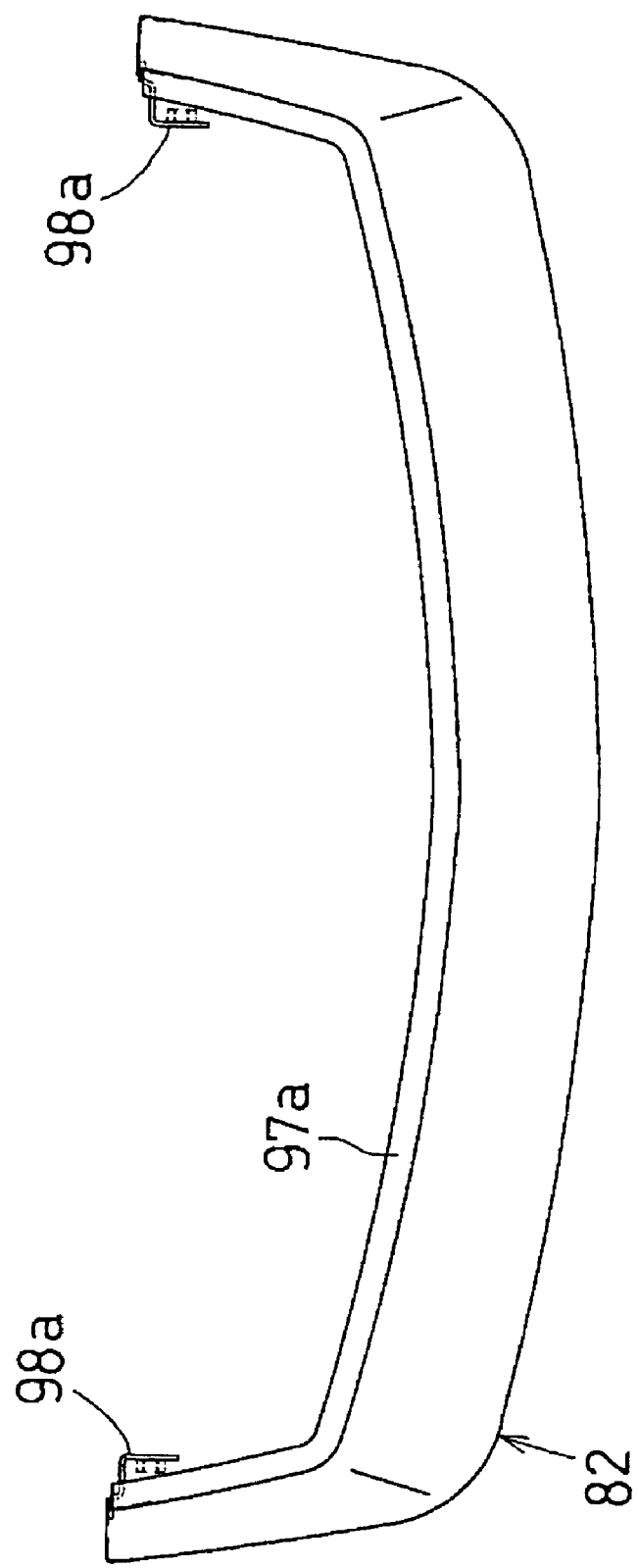
FIG. 12 is a plan view of the front grill member.
Figure 13:
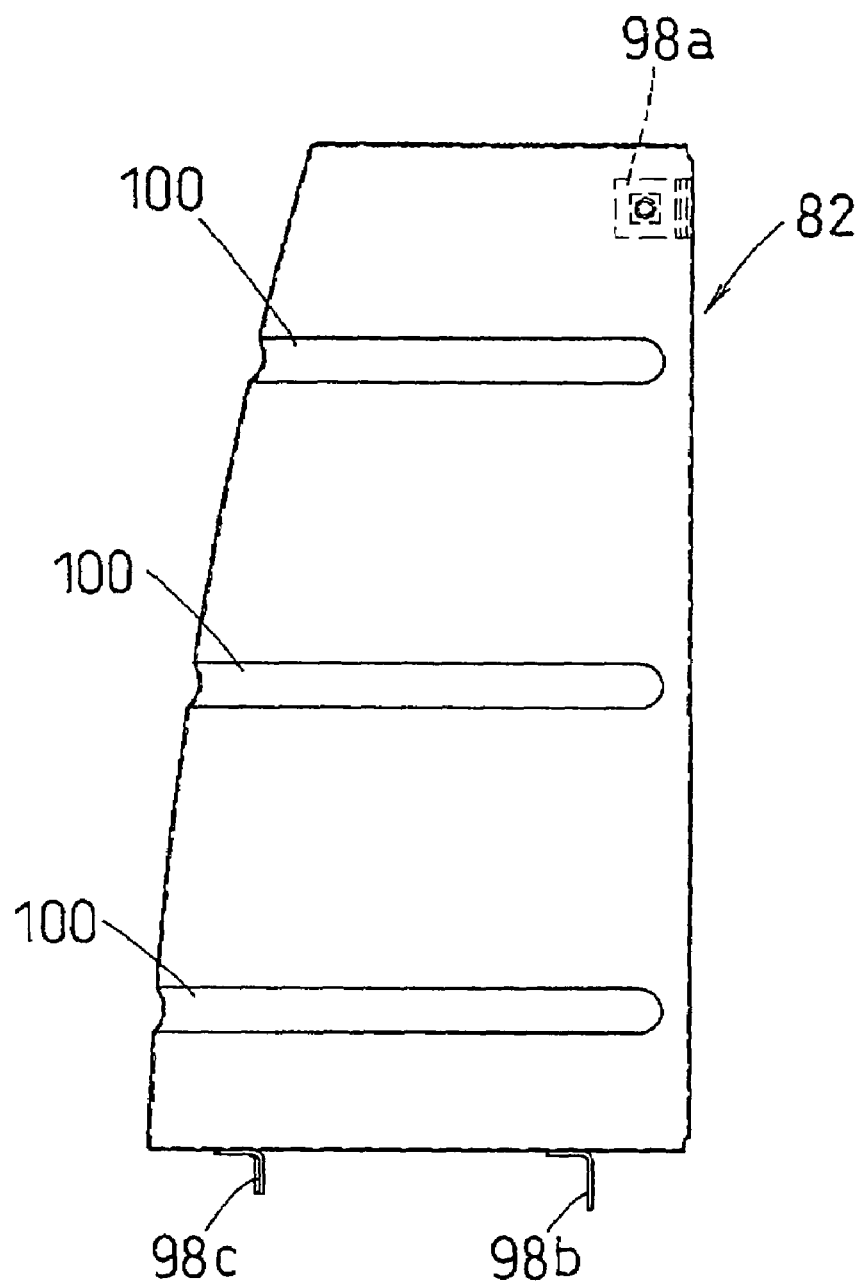
FIG. 13 is a side view of the front grill member.
Figure 14:
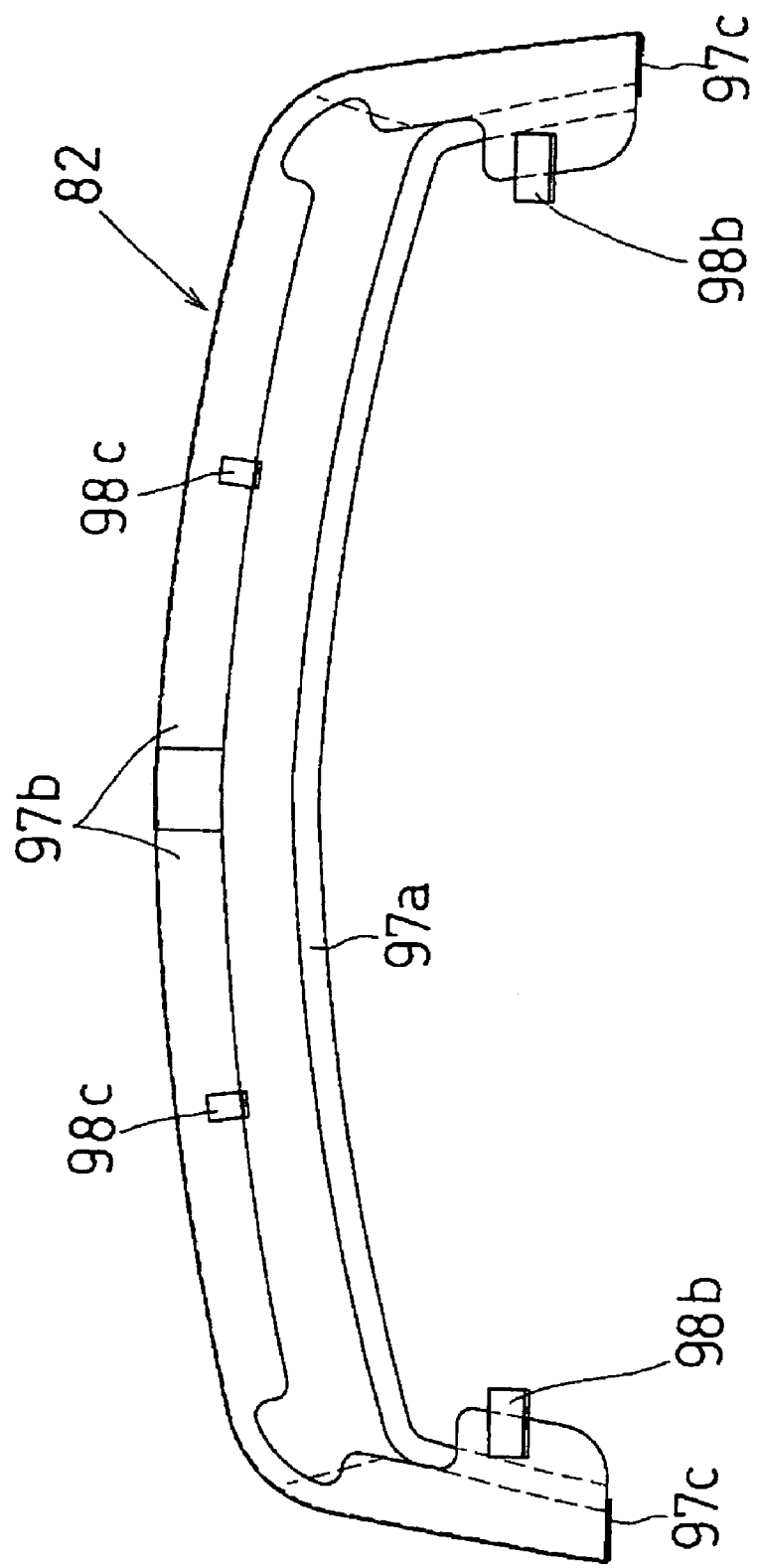
FIG. 14 is a bottom view of the front grill member.

As shown in FIG. 1 and FIG. 6, the front axle frame 10 includes a pair of right and left support members 11, 11 extending from the lower side of the engine 6 and projecting forwardly of the right and left front wheels 2, a flat-plate like attaching plate 12 mounted on the upper portion of the right and left support members 11, 11, and a plurality of brackets 13 connecting the attaching plate 12 to the right and left support members 11, 11.

As shown in FIG. 1, a rear upper portion of the hood 14 is connected to a front upper portion of a partitioning wall of the cabin 8 via a pivot member 15 attached to the front upper portion of the partitioning wall of the cabin 8. With this, as denoted by a two-dot chain line, the hood 14 can be vertically opened/closed, and at its opened posture, the hood 14 can fully open the engine room E.

Further, to the front side of the hood 14, there is formed a front grill member (corresponding to "first grill member") 82 and on the right and left sides of the hood 14, there are formed side grill members (corresponding to "second grill member") 83.

Forwardly of the rear ends of the side grill members 83, there are mounted air cooling auxiliary units including an intercooler 21, an oil cooler 22, a condenser 23, a receiver 24, etc.

Inside the engine room E, forwardly of a radiator 20, there is disposed the intercooler 21 for cooling introduced ambient air and forwardly of this intercooler 21, the oil cooler 22 is disposed. Forwardly of the oil cooler 22, there is disposed the condenser 23 for condensing cooling medium of an air conditioner mounted inside the cabin 8. And, the receiver 24 is disposed on the left side of the condenser 22. Further, a battery 25 is disposed forwardly of the condenser 23 and an air cleaner 27 is disposed upwardly of the battery 25.

Figure 5:
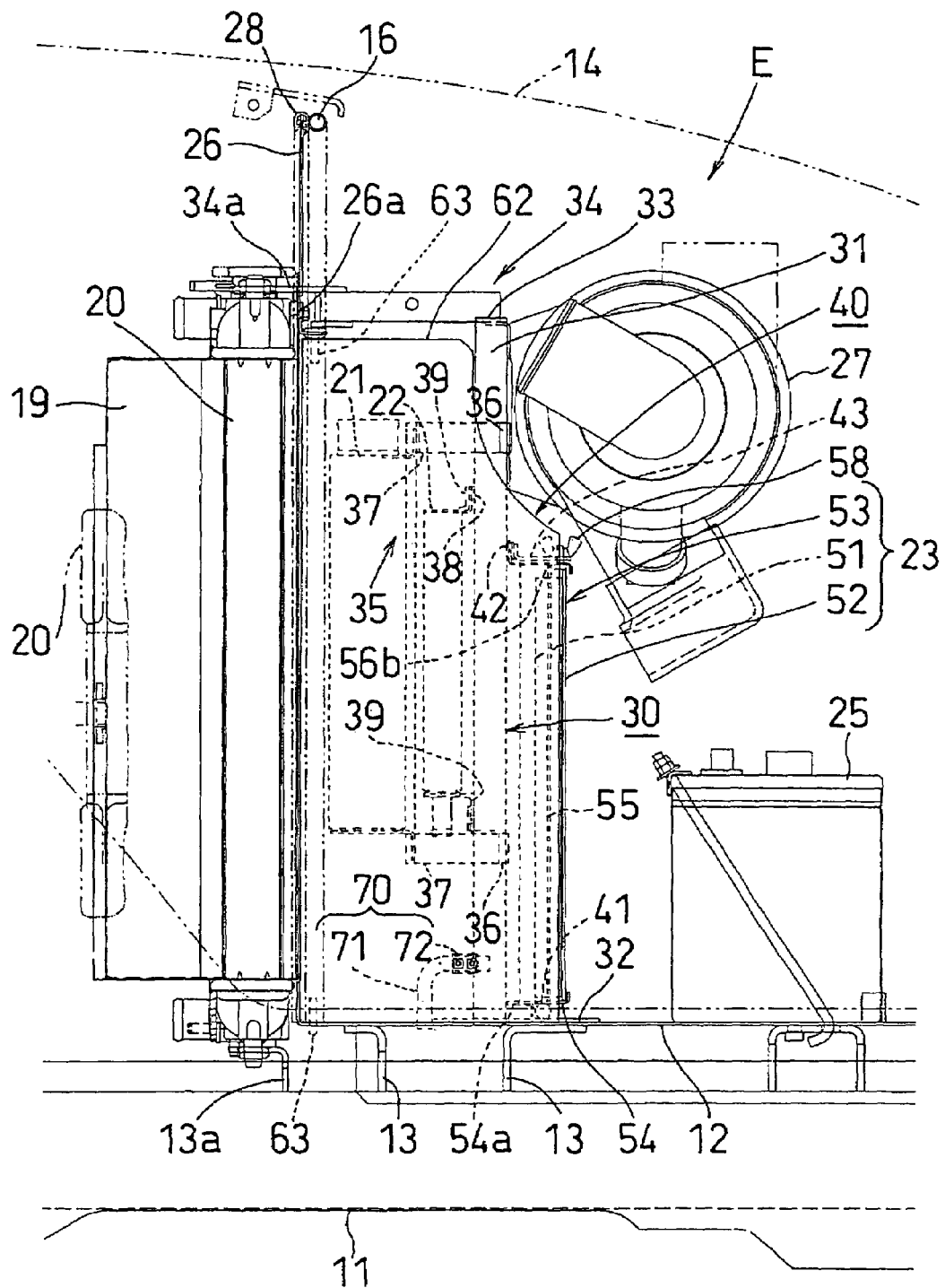
FIG. 5 is a right side view showing the principal portions inside the hood in an enlarged scale.

The radiator 20 is disposed forwardly of the engine 5, so that this radiator 20 is constructed as a front suction type adapted for introducing air from the front side and sending this air as cooling air to the engine 5 disposed rearward. As shown in FIG. 5, the lower portion of this radiator 20 is secured via brackets 13a to the right and left support members 11, 11 of the front axle frame 10.

The radiator 20 includes at the rear side thereof, a cylindrical air duct 19 and a radiator fan 20a. In operation, as the radiator fan 20a is driven at a high speed via a belt transmission means driven by the engine 5, the radiator 20 draws in ambient air from the front face and the side faces of the hood 14 shown in FIG. 2, so that the air can be introduced to the interior of the engine room E.

Further, as shown in FIG. 5 and FIG. 6, an outer edge of the front face of the radiator 20 is covered by a flat-plate like partitioning frame 26 extending to the vicinity of the inner face of the hood 14, and at an outer edge of this partitioning frame 26, there is disposed a weather strip 28 formed of an elastic resin. As this weather strip 28 comes into contact with a portal frame 16 attached to the inner face of the hood 14 at its closed posture, the gap between the portal frame 16 and the partitioning frame 26 is sealed.

With the above, the engine room E is partitioned across the partitioning frame 26 between a front section of the engine room including the battery 25, the condenser 23, the oil cooler 22, the intercooler 21, etc. and a rear section of the engine room including the radiator 20, the radiator fan 20a, the engine 5, etc. Hence, air introduced to the rear side of the radiator 20 by the radiator fan 20a does not flow in the engine room front section and this air will not be introduced again into the radiator 20.

Figure 2:
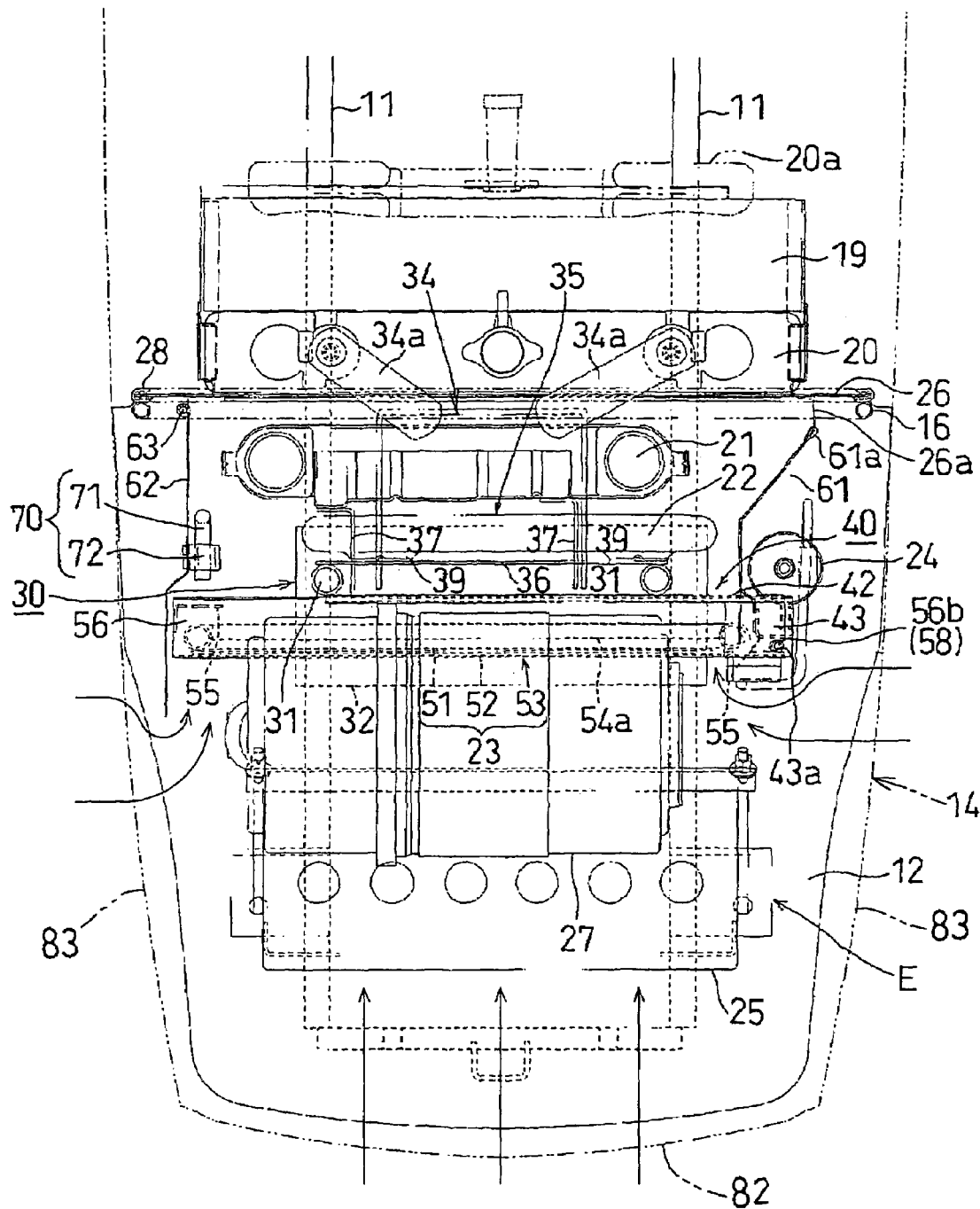
FIG. 2 is a view showing layout of air cooling auxiliary units inside a hood.

Further, the intercooler 21, the oil cooler 22 and the condenser 23 are air cooled units requiring air cooling. As shown in FIG. 2 and FIG. 5, these intercooler 21, oil cooler 22 and the condenser 23 are supported by a support frame 30 provided forwardly of the radiator 20.

The support frame 30 includes a pair of right and left support posts 31, 31, a flat-plate like bottom plate 32 connecting lower ends of the right and left support posts 31, 31 and a horizontal member 33 connecting upper ends of the support posts 31, 31. To the horizontal member 33, there is connected a frame member 34 extending over upper end faces of the intercooler 21 and the oil cooler 22 and extending toward the radiator 20. And, this frame member 34 includes a pair of right and left brackets 34a, 34a each extending like a fork and leading ends of the brackets 34a, 34a are connected via fasteners to the upper end face of the radiator 20.

Further, at a vertical center portion of the support frame 30, there is formed an intercooler attaching portion 35. This intercooler attaching portion 35 includes a pair of upper and lower connecting bars 36, 36 extending between the right and left support posts 31, 31 and stays 37 extending from the connecting bars 36 toward the radiator 20. To the respective stays 37 of the pair of upper and lower connecting bars 36, 36, the upper and lower ends of the intercooler 21 are connected respectively.

Also, downwardly of the upper connecting bar 36 of the intercooler attaching portion 35, there is supported a connecting member 38 interconnecting the pair of right and left support posts 31, 31, like the connecting bars 36. This connecting member 38 and the lower connecting bar 36 respectively include an oil cooler attaching bracket 39 extending toward the intercooler 21. As the upper and lower ends of the oil cooler 22 are connected respectively to the pair of upper and lower oil cooler brackets 39, 39, the oil cooler 22 is supported to the support frame 30 forwardly of the intercooler 21.

Further, the support frame 30 includes, at a front portion thereof, a condenser attaching portion 40. This condenser attaching portion 40 includes a bar 41 having a circular cross section and mounted on the upper face of the bottom plate 32 and extending in the right/left direction, a rail 42 having a U-shape in its side view and supported over center portions of the right and left support posts 31, 31 and a tongue member 43 extending forwardly from the left end of the rail 42. The tongue member 43 defines a cutout 43a cutout from a left end to a center portion of the member 43.

The condenser 23 includes a flat-plate like condenser body 51, a net 52 covering the front face of the condenser body 51 and a frame member 53 disposed to surround upper and lower ends and lateral portions of the condenser body 51. The frame member 53 is formed like a gate in its front view, by erecting side frames 55 respectively from right and left opposed ends of a rectangular lower frame 54 mounted on the bar 41 of the condenser attaching portion 40 of the support frame 30 and connecting upper ends of pair of right and left side frames 55, 55 via a rectangular upper frame 56.

Figure 4:
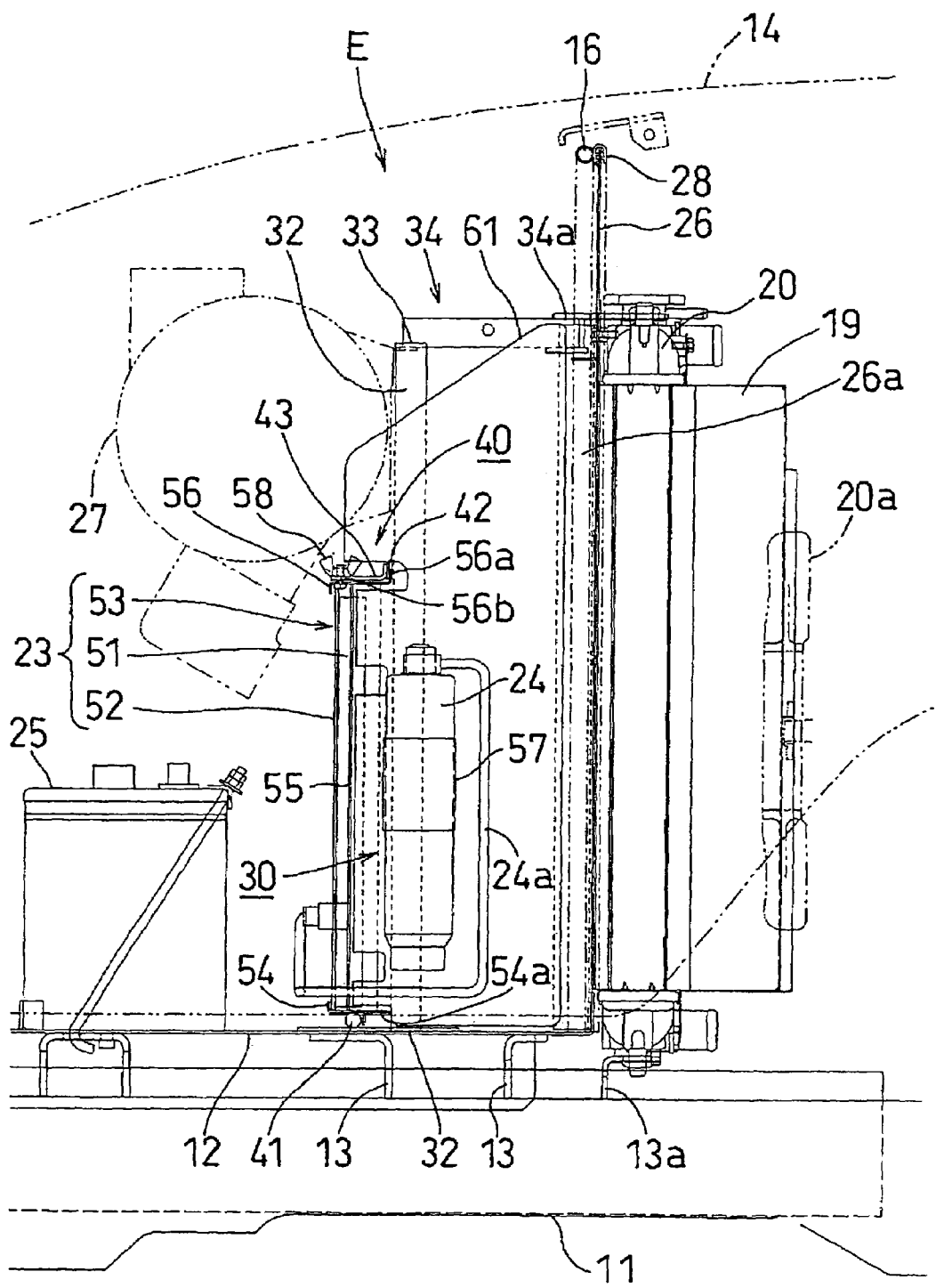
FIG. 4 is a left side view showing principal portions inside the hood in an enlarged scale.

As shown in FIG. 4, to the left side frame 55 of the frame member 53, there is attached a cylindrical receiver attaching member 57 via a fastener. As the receiver 24 is attached to this receiver attaching member 57, the receiver 24 is supported to the left rear portion of the condenser 23. Further, the receiver 24 is connected via a metal hose 24a, to the condenser body 51, so that cooling medium inside the receiver 24 can be supplied to the inside of the condenser body 51.

Moreover, to the bottom face of the lower frame 54 of the frame member 53, there is attached an angle member 54a having an L-shape in its side view and extending in the right/left direction of the lower frame 54. The upper frame 56 of the frame member 53 forms a flat-plate like projection 56a formed by vertically bending its rear end and the top face of the left end forms a threaded portion 56b to which a butterfly nut 58 is threaded.

Further, this condenser 23 is attached to the condenser attaching portion 40 of the support frame 30, with the bottom face of the lower frame 54 of the frame member 53 and a projecting portion of the angle member projection 56a of the upper frame 56 of the frame member 53 being slidably engaged with the rail 42.

With the above, the condenser 23 is supported to the support frame 30 to be sidable in the right/left direction of the support frame 30 along the rail 42 and the bar 41. The threaded portion 56b formed in the upper frame 56 of the frame member 53 of the condenser 23 is engaged with the cutout 43a of the tongue member 43 of the condenser attaching portion 40 and under this condition, the butterfly nut 58 is threaded thereto, whereby the tongue member 43 is fastened between the butterfly nut and the upper frame, so that the condenser 23 is supported forwardly of the support frame 30 inside the engine room E.

Further, by loosening the butterfly nut 58 to release the fastening, the condenser 23 can be drawn out in the right/left direction. So that, as denoted with the two-dot chain line in FIG. 3, the condenser 23 and the receiver 24 can be displaced out of the engine room E.

Between the condenser 23 (air cooling unit) supported to the frame member 30 and the radiator 20, there are provided a pair of right and left baffle plates (an example of "baffle member") 61, 62 configured for closing the sides of the opposing faces of these condenser 23 and the radiator 20, thereby to regulate introduction of air from these sides.

Each of the right and left baffle plates 61, 62 is formed by bending a metal or resin plate. Specifically, the left baffle plate 61, as shown in FIG. 2 and FIG. 4, is bent outward in the right/left direction as it extends toward the radiator 20 and its front end is fixed via a fixing member to the frame member 53 of the left side frame 55 of the condenser 23. With this, the left baffle plate 61 can be drawn out to one side (left side) in the right/left direction of the support frame 30. And, by drawing out the condenser 23, the closed condition of the left side between the opposed faces is released.

Also, at the rear end of the left baffle plate 61, there is attached a weather strip 61a. This weather strip 61a is placed in abutment against a leading end of a rectangular angle member 26a extending in the vertical direction and fixed to the front face of the partitioning frame 26 while supporting the condenser 23 forwardly of the support frame 30. With this, the gap between the left baffle plate 61 and the angle member 26a is sealed.

The right baffle plate 62, as shown in FIG. 2 and FIG. 5, closes the right side between the opposing faces and under this condition, its front end projects forwardly from the support frame 30 and its fore-and-aft intermediate portion is bent toward the inner side between the opposing faces and its rear end is located on the outer side of the right side edge of the radiator 20 to be adjacent the partitioning frame 26.

At the rear end of the right baffle plate 62, there are provided a pair of upper and lower pivot pins (vertical axis) 63, 63 having a common axis and projecting from the upper end and the lower end of the baffle plate 62, respectively. As shown in FIGS. 5 and 6, the upper pivot pin 63 is rotatably supported to a bracket 26b secured to the partitioning frame 26 via a fastener, whereas the lower pivot pin 63 is rotatably supported to the attaching plate 12 of the front axle frame 10.

Figure 3:
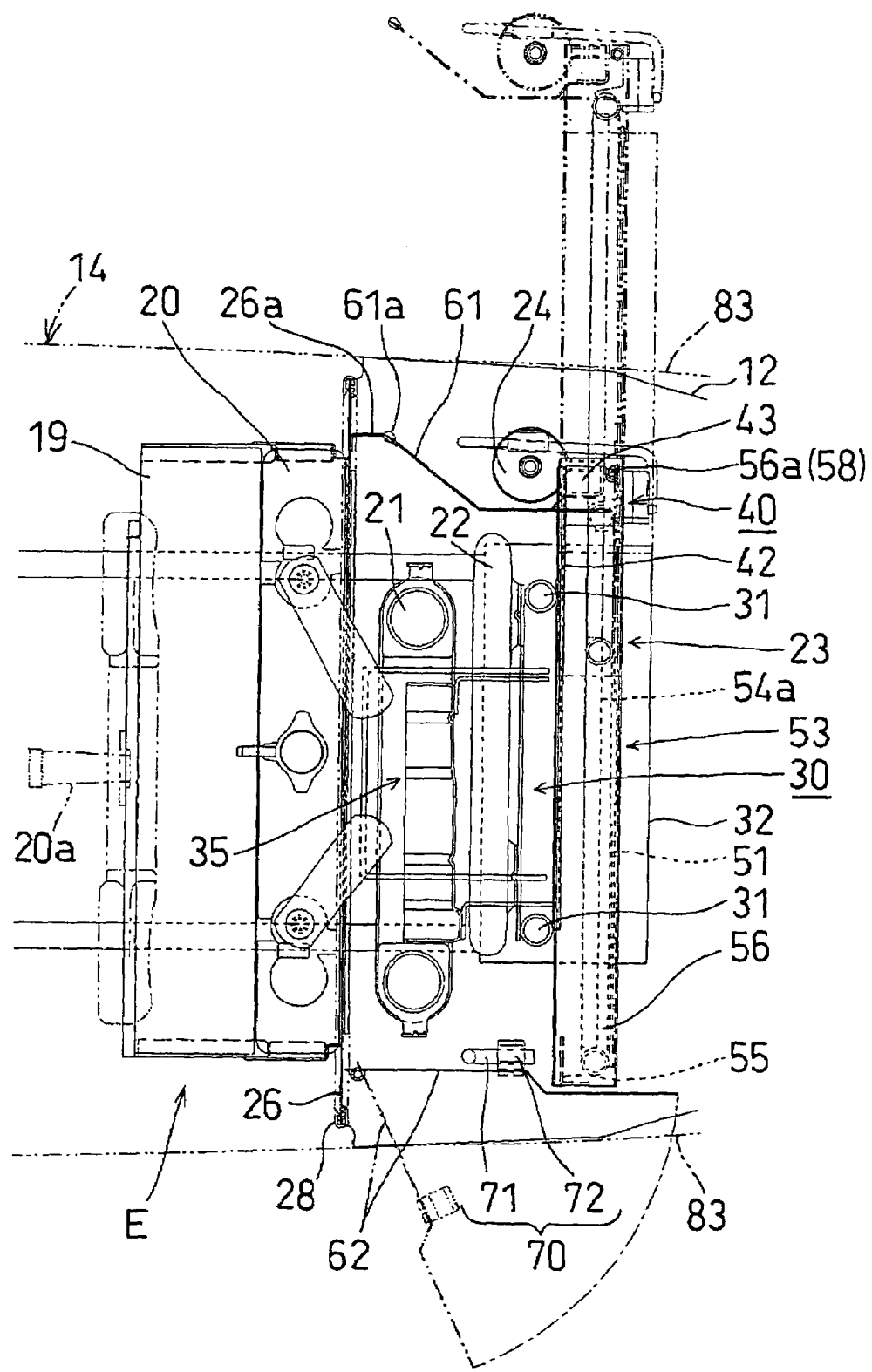
FIG. 3 is a plan view showing a condenser and function of a right side baffle plate.

With the above, the right baffle plate 62 is pivotally supported about the vertically axis formed by the upper and lower pivot pins 63, 63 in the vicinity of the partitioning frame 26 covering the outer edge of the radiator 20. As shown in FIG. 3, the posture of the right baffle plate 62 can be pivotally switched over between a closed posture with its front end being supported to the side of the condenser 23 thereby closing the right side between the opposing faces and an opened posture with its front end being opened to the outer side of the engine room E thereby opening between the opposing faces as shown in the two-dot chain line.

Further, between the right baffle plate 62 and the front axle frame 10, there is provided a closed position fixing means 70 for supporting the right baffle plate 62 under the closed posture. This closed position fixing means 70 includes an engaging member 71 formed by bending a pole projecting upwardly of the attaching plate 12 of the front axle frame 10 and a clip member 72 attached to the inner face of the right baffle plate 62 via a fastener and detachably engaged with the engaging member 71. Then, when the clip member 72 is engaged with the engaging member 71, the right baffle plate 62 is supported under the closed position. And, when this engagement between the clip member 72 and the engaging member 71 is released, the right baffle plate 62 becomes freely pivotable.

As shown in FIGS. 1 through 10, the hood 14 is formed like a box having a top plate portion, a front portion and pair of right and left sides. This hood 14 includes a hood body 81, an unillustrated framework disposed inside the body 81, a front grill member (corresponding to "first grill member") 82 provided at the front portion of the hood 14, a pair of right and left side grill members (corresponding to "second grill member") 83 provided at the right and left sides of the hood 14, and a lower grill member (corresponding to "first grill member") 84 provided at the lower portion of the hood 14.

The hood body 81 is formed of a plate metal or synthetic resin. As shown in FIGS. 1 through 12, at the front and right and left sides of the hood body 81, there are respectively formed a front opening 86 and a pair of right and left side openings 87 for introducing air. The front opening 86 extends between front ends of the right and left sides of the hood 14. Downwardly of the front opening 86 and the side openings 87, there is formed an elongate narrow lower opening 88. Between the front opening 86 and the lower opening 88 of the hood body 81, there is formed a housing portion 89 for housing headlamps etc.

The hood body 81 includes an attaching recess 91 extending from the upper and lower edges of the side openings 87 to the opening edge of the rear side and recessed inward in the right/left direction. And, this attaching recess 91 includes a plurality of attaching holes 92. Further, at the upper and lower edges of the front opening 86, there is provided an attaching recess 93 recessed inward. A vertically extending attaching frame 94 is provided at a border portion between the right and left side openings 87 and the front opening 86, and this attaching frame 94 defines attaching holes 96a, 96b. Along the outer periphery of the lower opening 88, there is defined a recess 88 and the lower opening 88 defines, at its center portion in the right/left direction, an attaching recess 95 recessed rearward.

As shown in FIGS. 11 through 14, the front grill member 82 is formed of a metal mesh, a punching metal, a porous synthetic resin plate, or the like and is formed like a hooked plate having right and left opposed ends thereof bent rearward. Along the outer periphery of the front grill member 82, there are provided an upper bent edge portion 97a, a lower bent edge portion 97b and right and left outer bent edge portions 97c which are bent rearward or inward in the right/left direction. These bent edge portions 97a, 97b, 97c include attaching pieces 98a, 98b, 98c projecting therefrom. So that, through these attaching pieces 98a, 98b, 98c, the attaching hole 96a, etc, and by fasteners such as bolts, the front grill member 82 is secured to the opening edge (attaching recess 93, the attaching frame 94, etc.) of the hood body 81. With this, the front grill member 82 is attached to the hood body 81 in such a manner as to close the front opening 86, with the front face and the outer face of the front grill member 82 being formed flush with the front face and the outer face of the hood body 81.

At a vertical intermediate portion of the front grill member 82, there are formed a plurality of ribs 100 recessed to the inner side in the form of arc and extending in the right/left direction and the fore and aft direction, with the ribs 100 being spaced apart from each other. The substantially entire face of the front grill member 82 except the bent edge portions 97a, 97b, 97c and the ribs 100 is formed as an air vent hole forming portion where a plurality of air vent holes (example of first air vent holes) 101 are formed. Therefore, through these many air vent holes 101 of the front grill member 82, ambient air is drawn in from the front face of the hood 14 toward the radiator 20.

Figure 15:
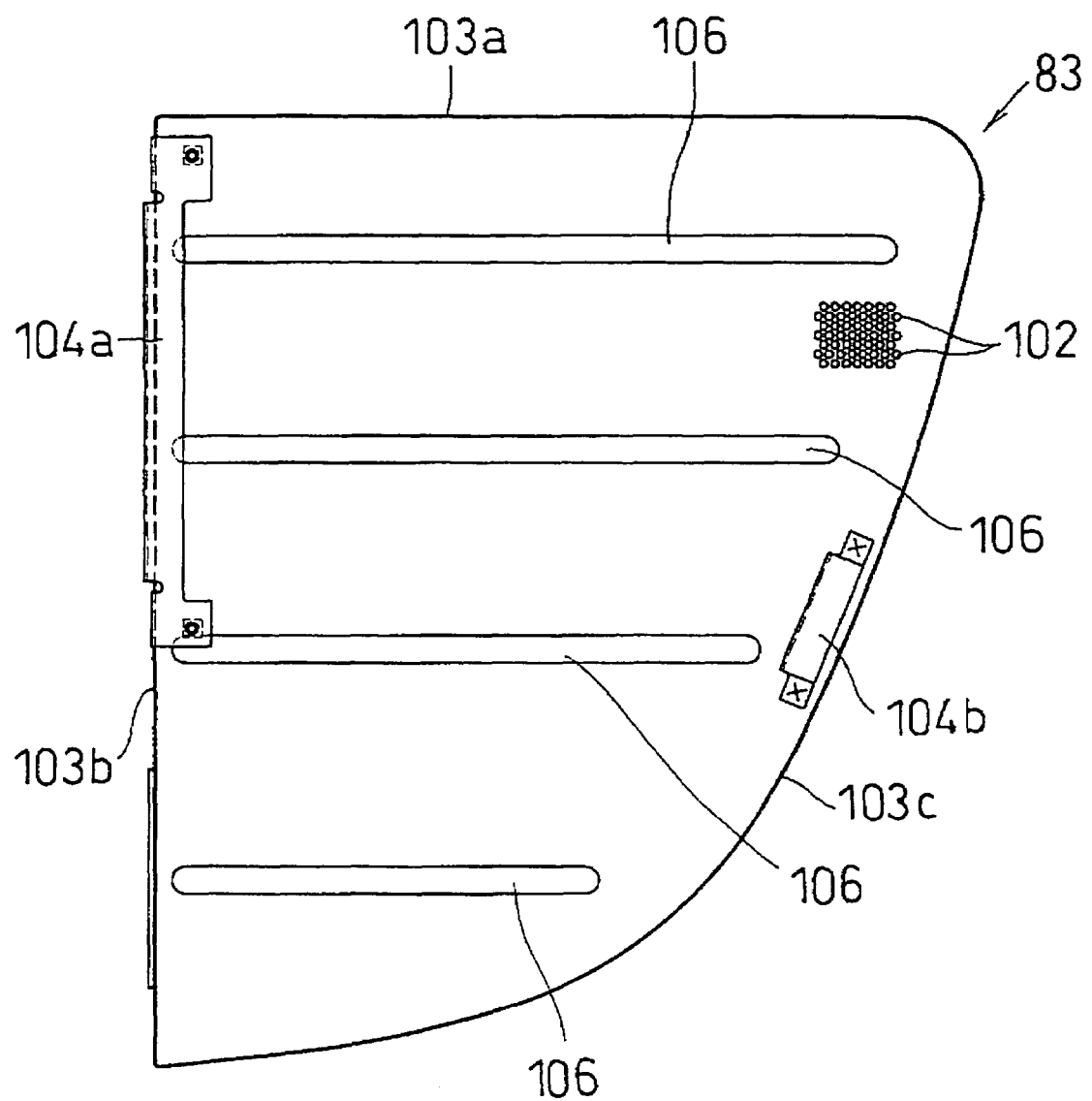
FIG. 15 is a side view of a side grill member.
Figure 16:
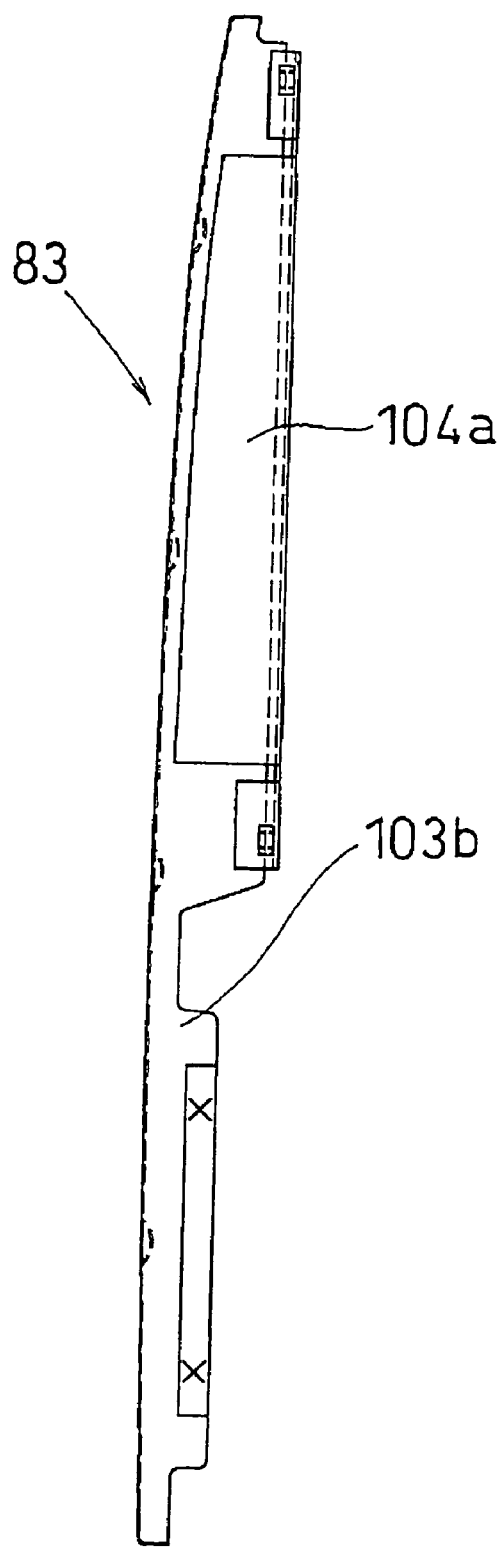
FIG. 16 is a front view of the side grill member.
Figure 17:
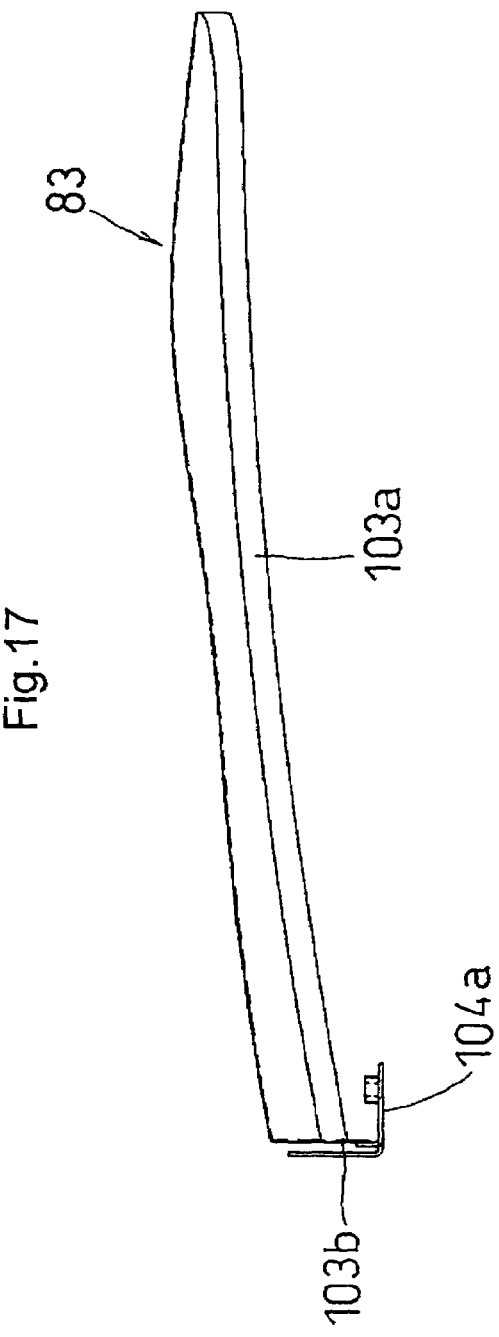
FIG. 17 is a plan view of the side grill member.
Figure 18:
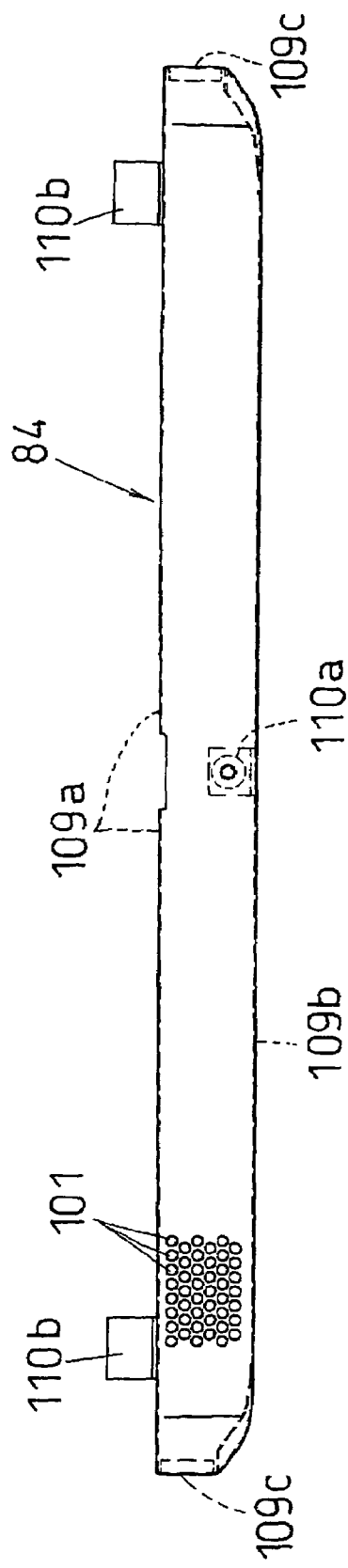
FIG. 18 is a front view of a lower grill member.
Figure 19:
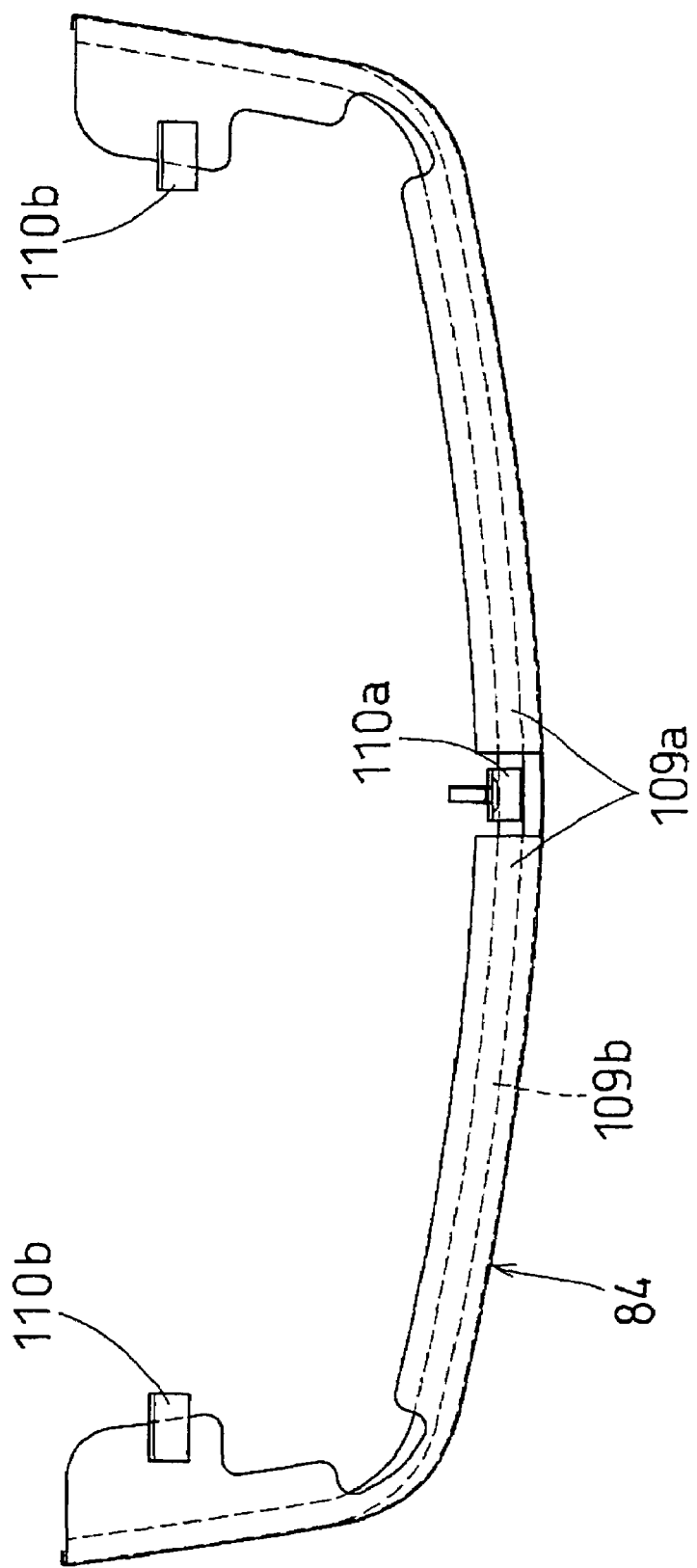
FIG. 19 is a plan view of the lower grill member.
Figure 20:
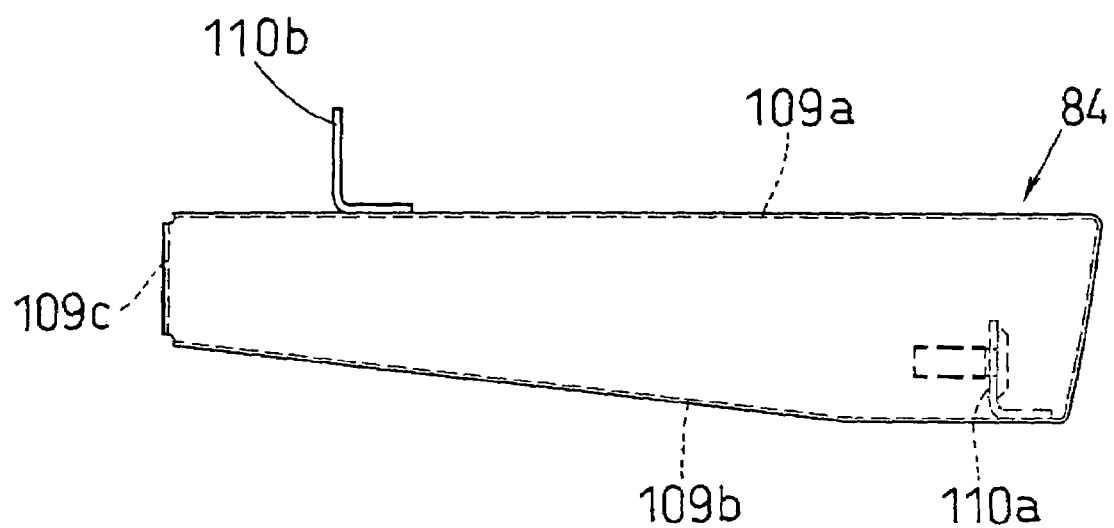
FIG. 20 is a side view of the lower grill member.
Figure 21:
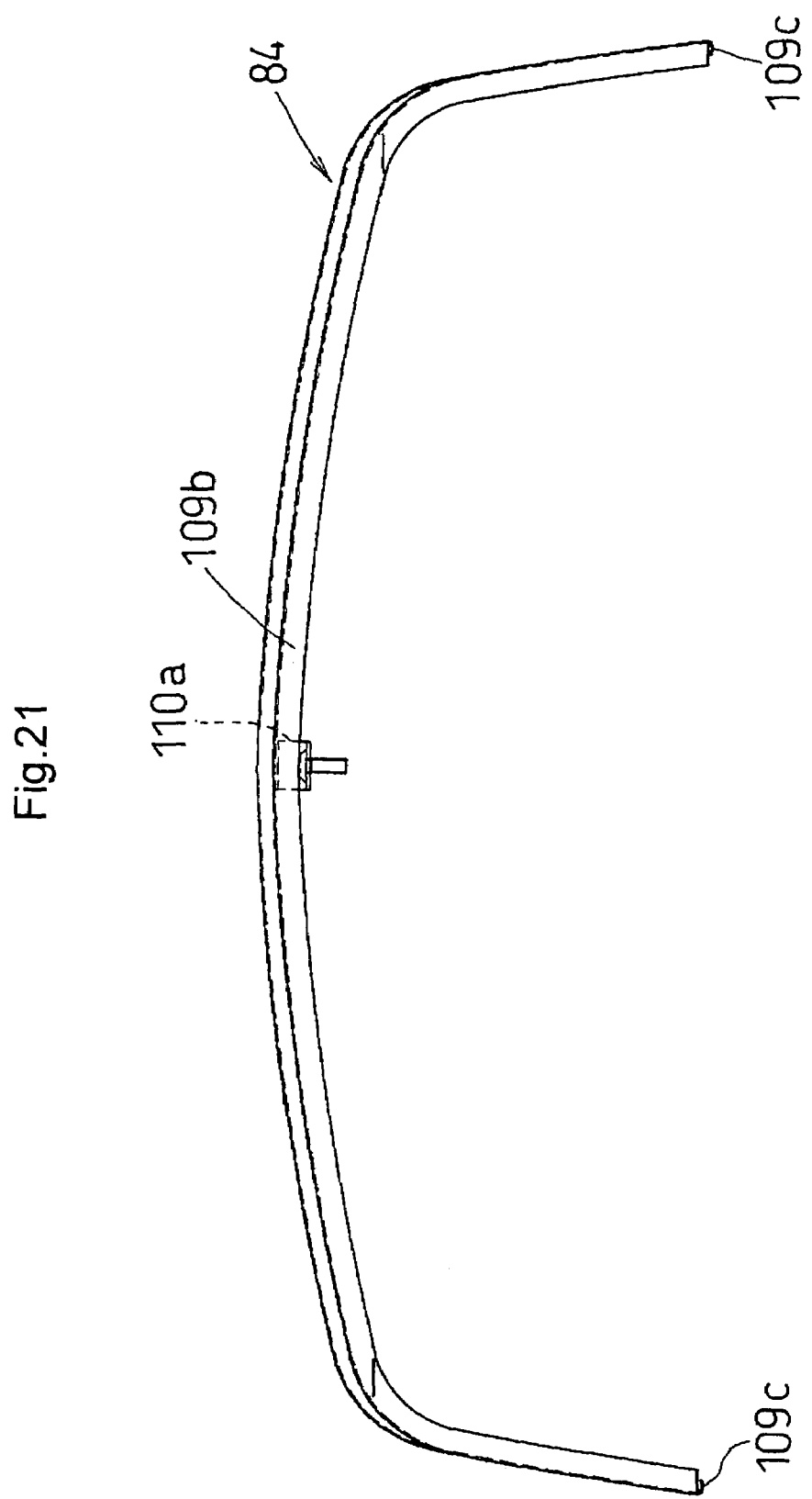
FIG. 21 is a bottom view of the lower grill member.

As shown in FIGS. 15 though 17, each side grill member 83 is formed of a metal mesh, a punching metal, a porous synthetic resin plate, or the like and formed like a substantially rectangular plate-like member corresponding to the side opening 87. Along the outer periphery of the side grill member 83, there are provided bent edge portions 103a, 103b, 103c which are bent rearward or inward in the right/left direction. The bent edge portion 103b or the outer periphery of the side grill member 83 includes attaching pieces 104a, 104b. So that, through these attaching pieces 104a, 104b and the attaching holes 92, 96b and by fasteners such as bolts, the side front grill member 83 is secured to the opening edge (attaching recess 91 and the attaching frame 94) of the hood body 81. With this, the side grill member 83 is attached to the hood body 81 in such a manner as to close the side opening 87, with the front face and the outer face of the side grill member 83 being formed flush with the front face and the outer face of the hood body 81.

At a vertical intermediate portion of the side grill member 83, there are formed a plurality of ribs 106 recessed to the inner side in the form of arc and extending in the right/left direction and the fore and aft direction, with the ribs 106 being spaced apart from each other. The substantially entire face of the side grill member 83 except the bent edge portions 103a, 103b, 103c and the ribs 106 is formed as an air vent hole forming portion where a plurality of air vent holes 101 are formed. Therefore, through these many air vent holes 101 of the pair of the side grill members 83, ambient air is drawn in from the side faces of the hood 14 toward the radiator 20.

As shown in FIGS. 18 through 21, the lower grill member 84 is formed like a hooked-shaped plate having right and left opposed ends thereof bent rearward. Along the outer periphery of the lower grill member 84, there are provided bent edge portions (an upper bent edge portion, a lower bent edge portion and right and left outer bent edge portions) 109a, 109b, 109c. The bent edge portion 109b or the bent edge portion 109a of the lower grill member 94 includes attaching pieces 110a, 110b projecting therefrom. Then, the front grill member 82 is fixed through the attaching pieces 110a, 110b and by fasteners such as bolts to e.g. the attaching recess 95 of the hood body 81, so that the lower grill member 84 is attached to the hood body 81 in such a manner as to close the lower opening 88 of the hood body 81, with the front face and the outer face of the lower grill member 84 being formed flush with the front face and the outer face of the hood body 81. The substantially entire face of the lower grill member 84 except the bent edge portions 109a, 109b, 109c is formed as an air vent hole forming portion where a plurality of air vent holes 101 (corresponding to the first air vent holes) are formed. Therefore, through these many air vent holes 101 of the lower grill member 84, ambient air is drawn in from the front lower end of the hood 14 toward the radiator 20.

Figure 22:
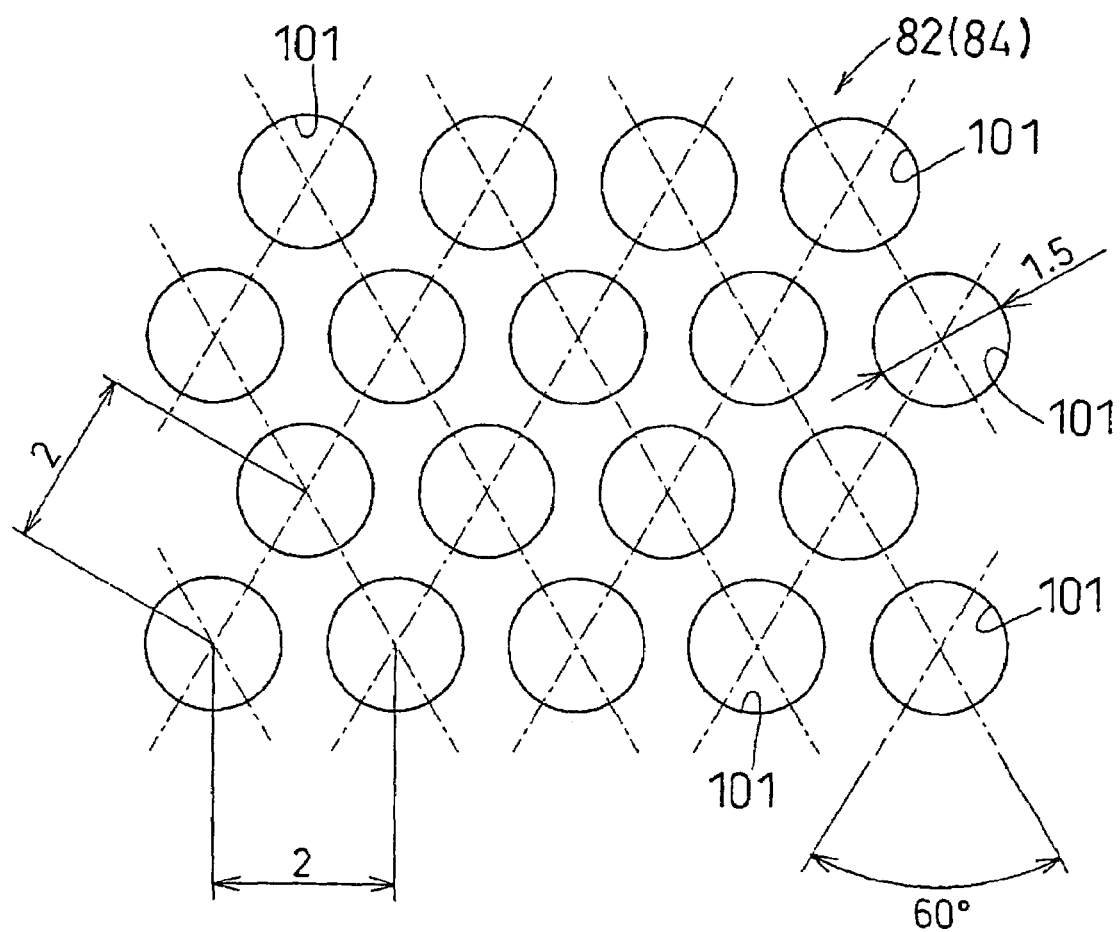
FIG. 22 is an enlarged front view showing air vent portions of the front grill member or the lower grill member.

As shown in FIG. 22, the air vent holes (corresponding to the first air vent holes) 101 of the front grill member 82 are formed as round holes having a diameter of 1.5 mm. And, the disposing pitch of these air vent holes 101 is set to 2.0 mm. Like the front grill member 82, the air vent holes 101 of the lower grill member 84 are also formed as round holes having a diameter of 1.5 mm. And, the disposing pitch of these air vent holes 101 is set to 2.0 mm.

Figure 23:
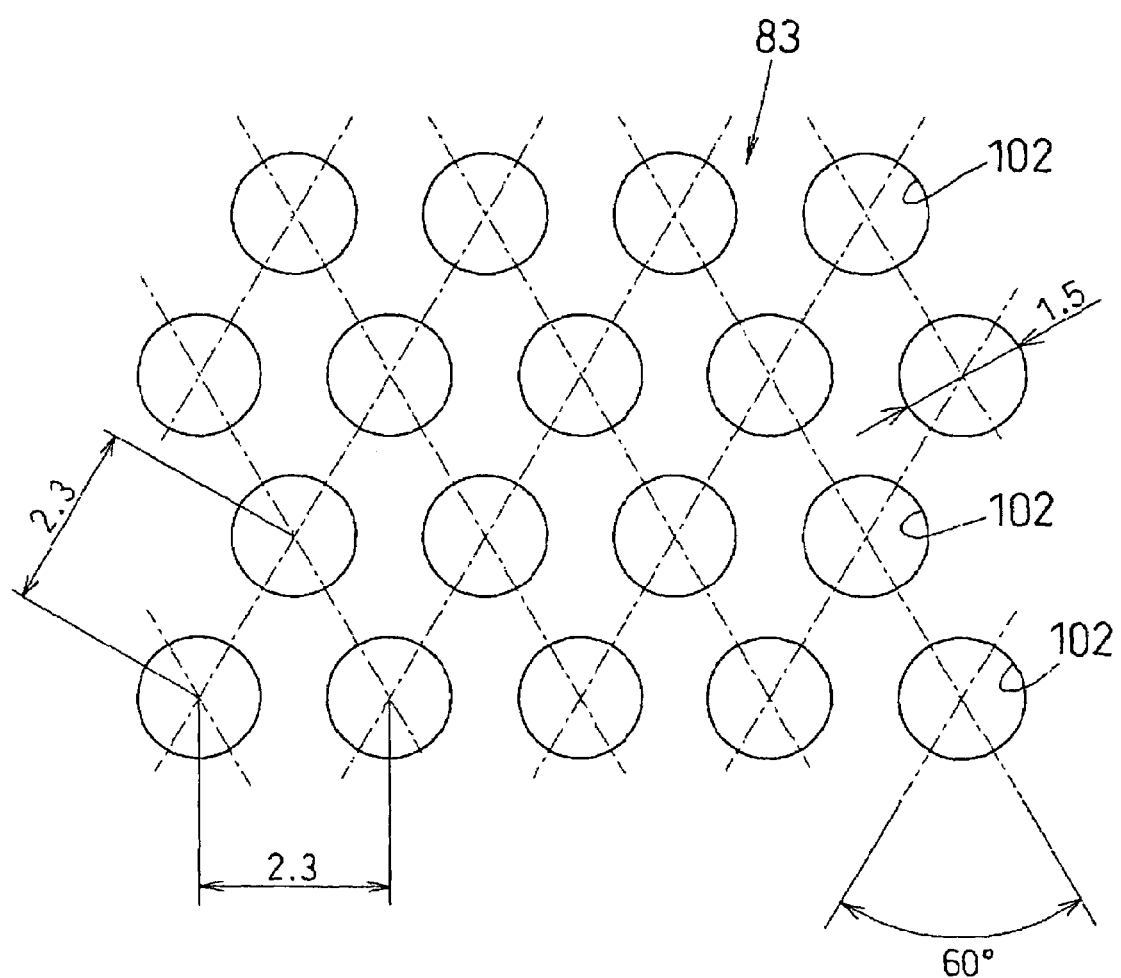
FIG. 23 is a enlarged front view of air vent portions of the side grill member.

As shown in FIG. 23, the air vent holes 102 (corresponding to the second air vent holes) of the side grill member 83 are also formed as round holes having a diameter of 1.5 mm. But, the disposing pitch of these air vent holes 102 is set to 2.3 mm.

With the above arrangements, between each side face and the front face of the hood, vent hole area ratios thereof (a ratio of vent forming area relative to a unit area of the air vent hole forming portion) are made different from each other. That is to say, the disposing densities of the air vent holes 101, 102 are rendered different from each other, depending on the positions of the grill members 82, 83, 84, so as to equate the velocities of the ambient air drawn in respectively from the right and left sides and the front side of the hood 14.

Namely, the radiator 20 inside the hood 14 is disposed adjacent the right and left side faces of the hood 14, but disposed far from the front face of the hood 14. For this reason, in spite of the presence of the baffle plates 61, 62, the force of drawing ambient air from the air vent holes 102 of the right and left sides of the hood 14 is stronger than the force of drawing ambient air from the air vent holes 101 of the front side and the air vent holes 101 of the front lower end of the hood 14. Therefore, while the size of the air vent holes is fixed same from the right and left sides to the front side of the hood 14, the disposing density (the number of the air vent holes per unit area) of the air vent holes 102 of the side face of the hood 14 is set smaller than the disposing density of the air vent holes 101 of the front side and also of the front lower end of the hood 14, thereby to equate the velocities of the ambient air drawn in respectively from the right and left sides and the front side of the hood 14. In other words, the ratio of the area forming the air vent holes 101 relative to the total vent hole forming area is set smaller for the side faces of the hood 14 than for the front face of the same.

With the above-described embodiment, since the pair of right and left baffle plates 61, 62 for closing the opposing sides of the radiator 20 and the condenser 23 are disposed inside the engine room E, the flow of air introduced to the radiator 20 from the right and left sides between the opposing faces is regulated. And, as this air collides with the right and left baffle plates 61, 62, its velocity is reduced and the air will flow forwardly of the pair of right and left baffle plates 61, 62, detouring to the front side of the condenser 23.

Accordingly, the air drawn in from the side grill members 83 of the hood 14 to the front side of the radiator 20 will be introduced to the condenser 23 from the front side thereof. With this, not only the radiator 20, but also the other air cooling auxiliary units including the intercooler 21, the oil cooler 22, the condenser 23, etc. disposed in series in front of the radiator 20 can be cooled efficiently as well.

Further, as the introduction of the air from the right and left sides of the radiator 20 is regulated by the pair of right and left baffle plates 61, 62, the velocity of this air drawn in through the side grill members 83 of the hood 14 is reduced, thereby to reduce the clogging of the grill faces of the side grill members 83 with foreign objects such as bugs, dust, etc.

Also, for effecting maintenance or checking of the radiator 20, the intercooler 21, the oil cooler 22, etc, first, as shown in FIG. 2, the hood 14 will be switched from the closed posture to the opened posture to expose the engine room E.

Next, the butterfly nut 58 threaded to the threaded portion 56 of the upper frame 56 of the condenser 23 supported forwardly of the support frame 30 will be loosened to release the fastened engagement between the butterfly nut 68 and the tongue member 43 of the condenser attaching portion 40 of the support frame 30. With this, the condenser 23 can be drawn out in the right/left direction of the support frame 30. Then, as shown by the two-dot chain line in FIG. 3, by drawing out the condenser 23 to the left side of the front axle frame 10, the condenser 23 and the receiver 24 will be moved out of the engine room E. In association with this, the front face of the oil cooler 22 which was opposed to the rear face of the condenser 23 will be exposed.

Further, when the condenser 23 is drawn out, the left baffle plate 61 is moved out of the engine room E together with this condenser 23. Hence, the closed condition of the left side between the opposing faces is released, so that the left sides of the intercooler 21 and the oil cooler 22 are exposed.

Further, by removing the clip member 72 of the right baffle plate 62 from the engaging member 71, the closed posture of the right baffle plate 62 is released. Then, as denoted by the two-dot chain line in FIG. 2, by pivoting the right baffle plate 62 from the closed posture to the opened posture, the closed condition of the right side between the opposing faces is released, whereby the right sides of the intercooler 21 and the oil cooler 22 are exposed.

Further, according to the above-described embodiment, by drawing the left baffle plate 61 out of the engine room E together with the condenser 23 along the right/left direction of the vehicle body and also with a simple operation of pivoting the right baffle plate 62 from its closed posture to be opened to the outside of the engine room E, the opposed sides and the front side of the intercooler 21 and the oil cooler 22 can be exposed. Hence, the operator can easily carry out the maintenance or checking operation of the oil cooler 22 and the intercooler 21, without having to detach the right and left baffle plates 61, 62. Moreover, when it is desired to mount an insect net to the front of the radiator 20, replacement or maintenance of this insect net can be easily carried out.

Moreover, since the front end of the right baffle plate 62 is supported at the closed condition by the above-described closed position fixing means 70, there is no need of supporting the right baffle plate 62 by means of e.g. a detachable fastener and also no tool is required for releasing the closed condition. Also, since the right baffle plate 62 is supported at the closed condition by the above-described closed position fixing means 70, it is possible to restrict vibration or oscillation of this right baffle plate 62 due to wind pressure of the introduced air. Hence, nose generation resulting from such vibration and looseness of the right baffle plate 62 can be restricted advantageously.

Further, according to the above-described embodiment, through the many air vent holes 101 of the front grill member 82 and the air vent holes 102 of the side grill members 83, ambient air is drawn in from the right and left sides and the front side of the hood 14 toward the radiator 20. Further, through the many air vent holes 101 of the lower grill member 84, ambient air is drawn in from the front lower end of the hood 14 toward the radiator 20. In the course of this, the radiator 20 inside the hood 14 is disposed adjacent the right and left side faces of the hood 14, but disposed far from the front face of the hood 14. Hence, the force of drawing ambient air from the air vent holes 102 of the side faces of the hood 14 is stronger than the force of drawing ambient air from the air vent holes 101 of the front side and the air vent holes 101 of the front lower end of the hood 14. However, since the disposing density of the air vent holes 102 of the side grill members 83 is set smaller than the disposing density of the air vent holes 101 of the front grill member 82 and the disposing density of the air vent holes 101 of the lower grill member 84. As a result, the velocities of the ambient air drawn in from the right and left sides and the front side of the hood 14 are equated with each other. Therefore, unlike the conventional art, the velocity of the ambient air drawn in from the lateral sides of the hood 14 will not become higher. So that, the clogging of the air vent holes 102 of the side faces of the hood 14 with foreign objects such as grass, bugs, dust or the like can be effectively avoided. There will occur no shortage of cooling air to the engine 16, etc. inside hood 14 due to such clogging of the air vent holes 102. And, overheating of the engine 16 or insufficient cooling of the air conditioner can be avoided.

Second Embodiment

Figure 24:
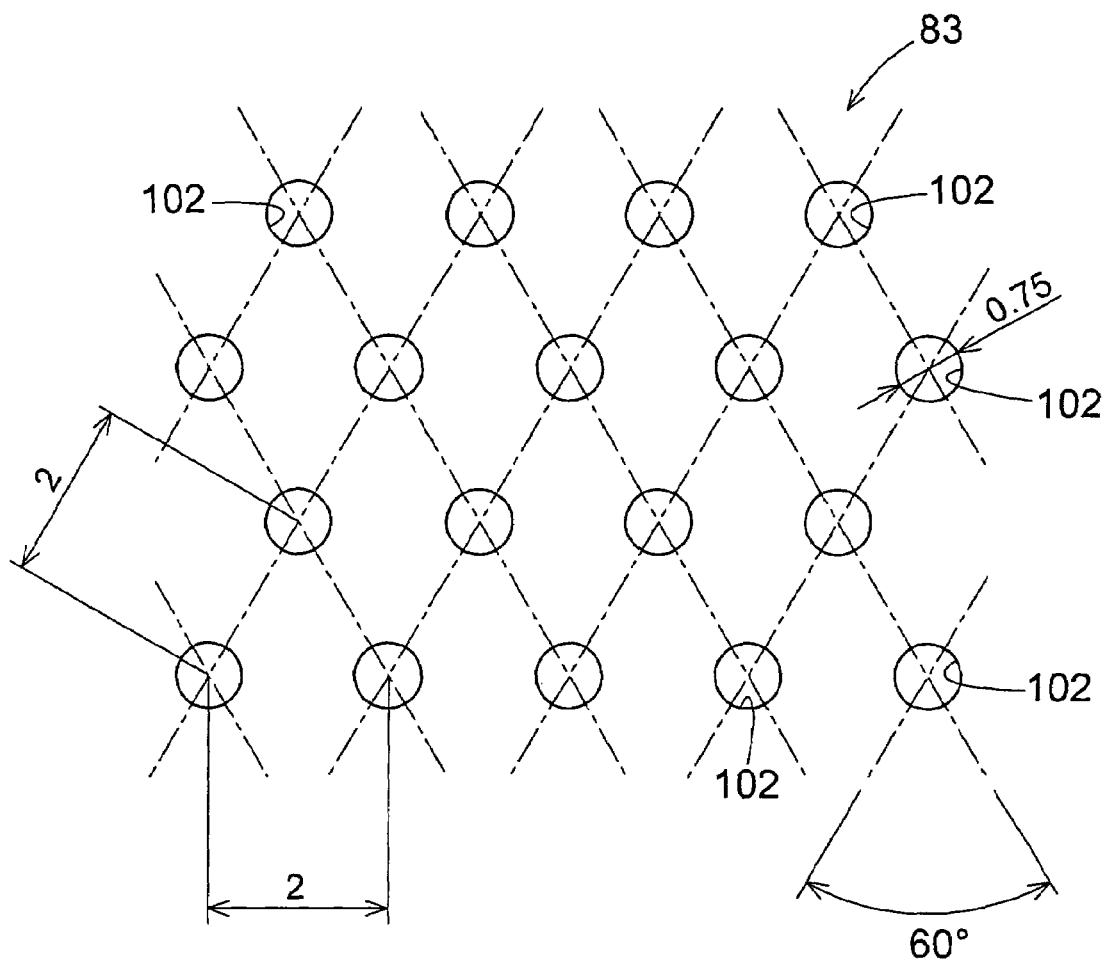
FIG. 24 shows a second embodiment of the invention and is an enlarged front view of a modification of the side grill member shown in FIG. 23.

The side faces of the hood 14 can be alternatively constructed as shown in FIG. 24.

In the first embodiment, the size of the air vent holes is set same for the right and left side faces and the front face of the hood 14 and the disposing density (the number of air vent holes per unit area) is set smaller for the air vent holes 102 of the side faces of the hood 14 than the air vent holes 101 of the front face of the hood 14 and the air vent holes 101 of the front lower end of the hood 14.

Instead, as shown in FIG. 24, in this second embodiment, the air vent holes 102 of the side faces of the hood 14 are smaller than the air vent holes 101 of the front face of the hood 14 and the air vent holes 101 of the front lower end of the hood 14. With this, the ratio of the air vent holes relative to the air vent hole forming area is smaller for the side faces of the hood 14 than for the front face thereof.

In this second embodiment, as shown in FIG. 24 for example, the air vent holes 102 (corresponding to the second air vent holes) of the side grill member 83 are formed as round holes with a diameter of 0.75 mm, which is a half of the diameter: 1.5 mm of the air vent holes (corresponding to the first air vent holes) 101 of the front face and the front lower end of the hood 14, as shown in FIG. 22. Incidentally, regarding the disposing pitch of the air vent holes 102, the disposing pitch of the holes 102 is set same as the disposing pitch 2.0 mm of the air vent holes 101 of the front face and the front lower end of the hood 14.

With this alternative construction too, it is possible to equate the velocities of the introduced ambient air from the right and left faces and the front face of the hood 14.

Third Embodiment

Figure 25:
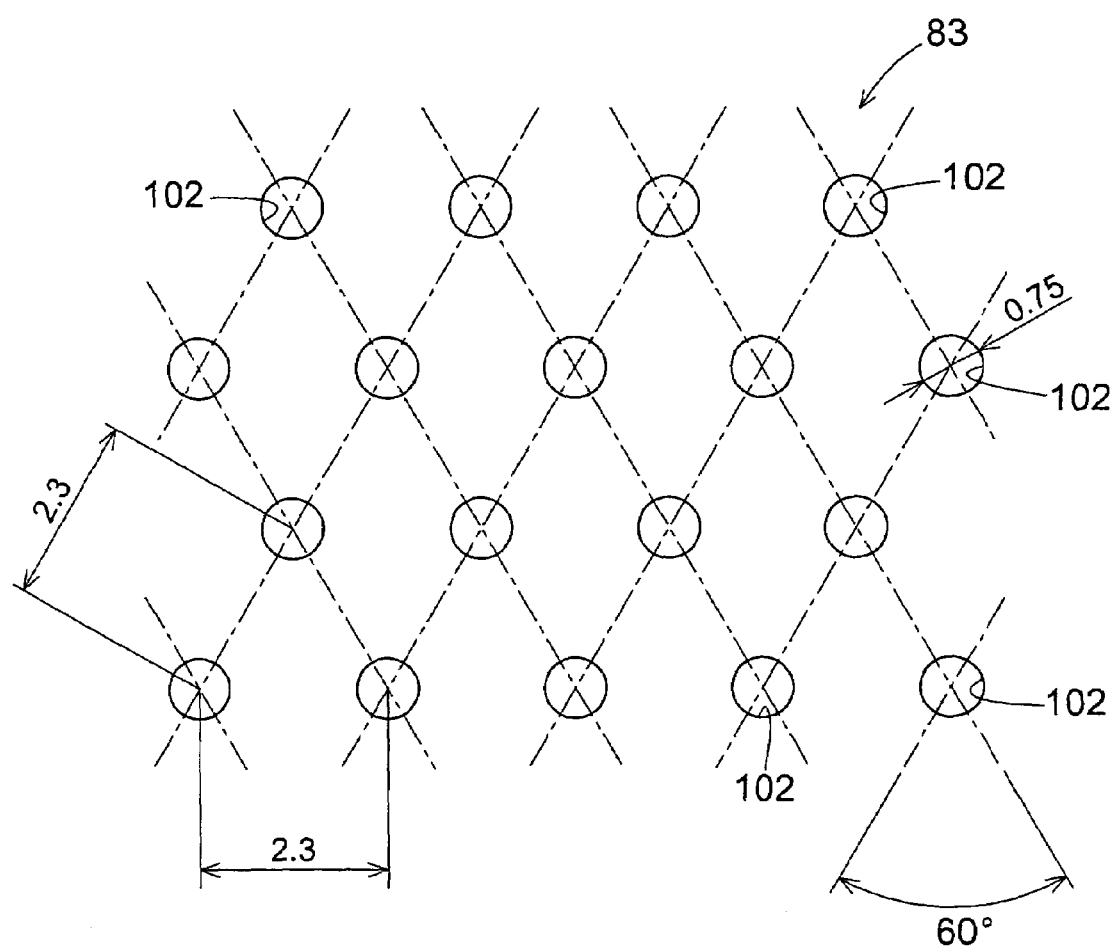
FIG. 25 shows a third embodiment of the invention and is an enlarged front view of a further modification of the side grill member shown in FIG. 23.
Figure 26:
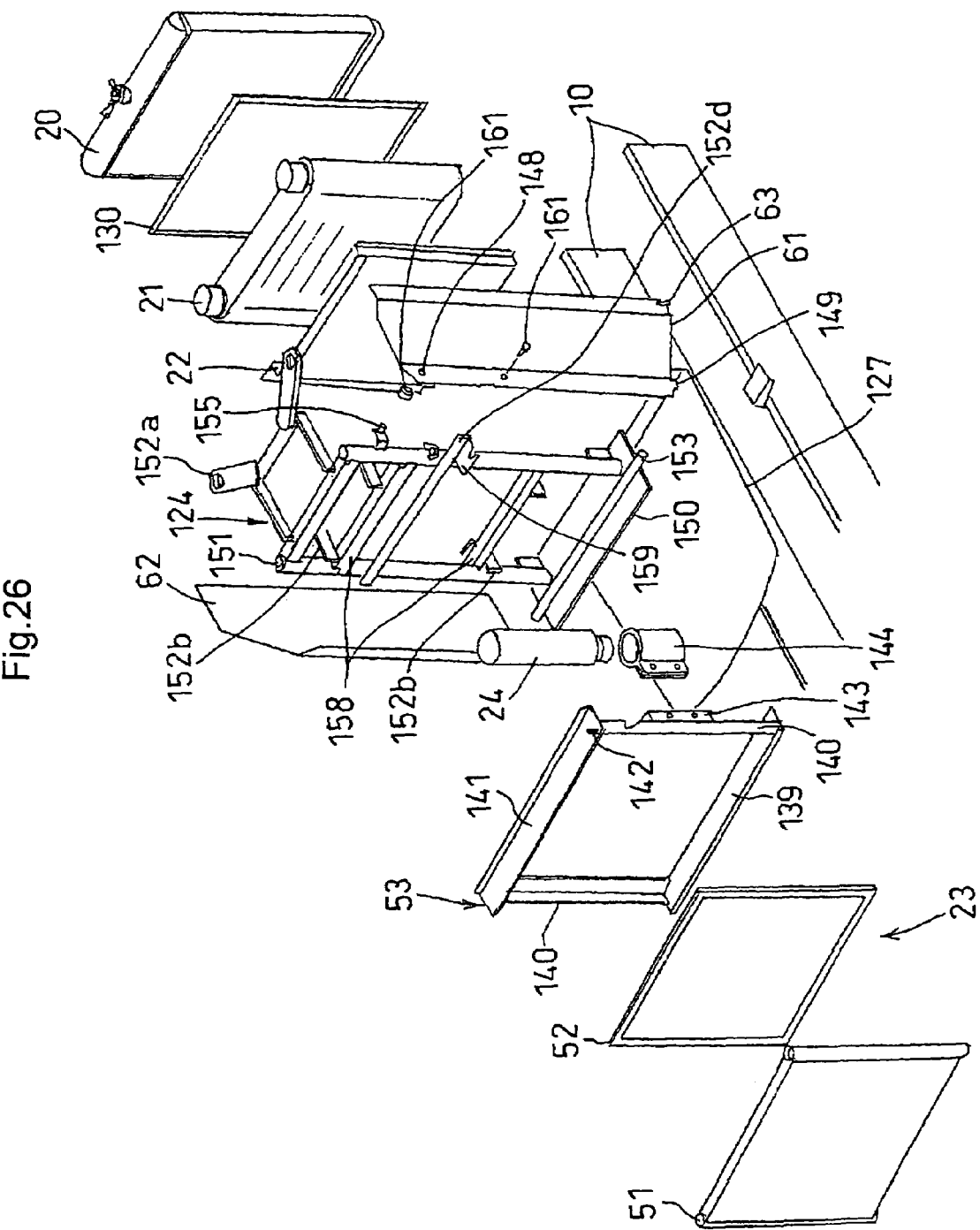
FIG. 26 shows a fourth embodiment of the invention and is an exploded plan view of principal members disposed inside the hood.
Figure 27:
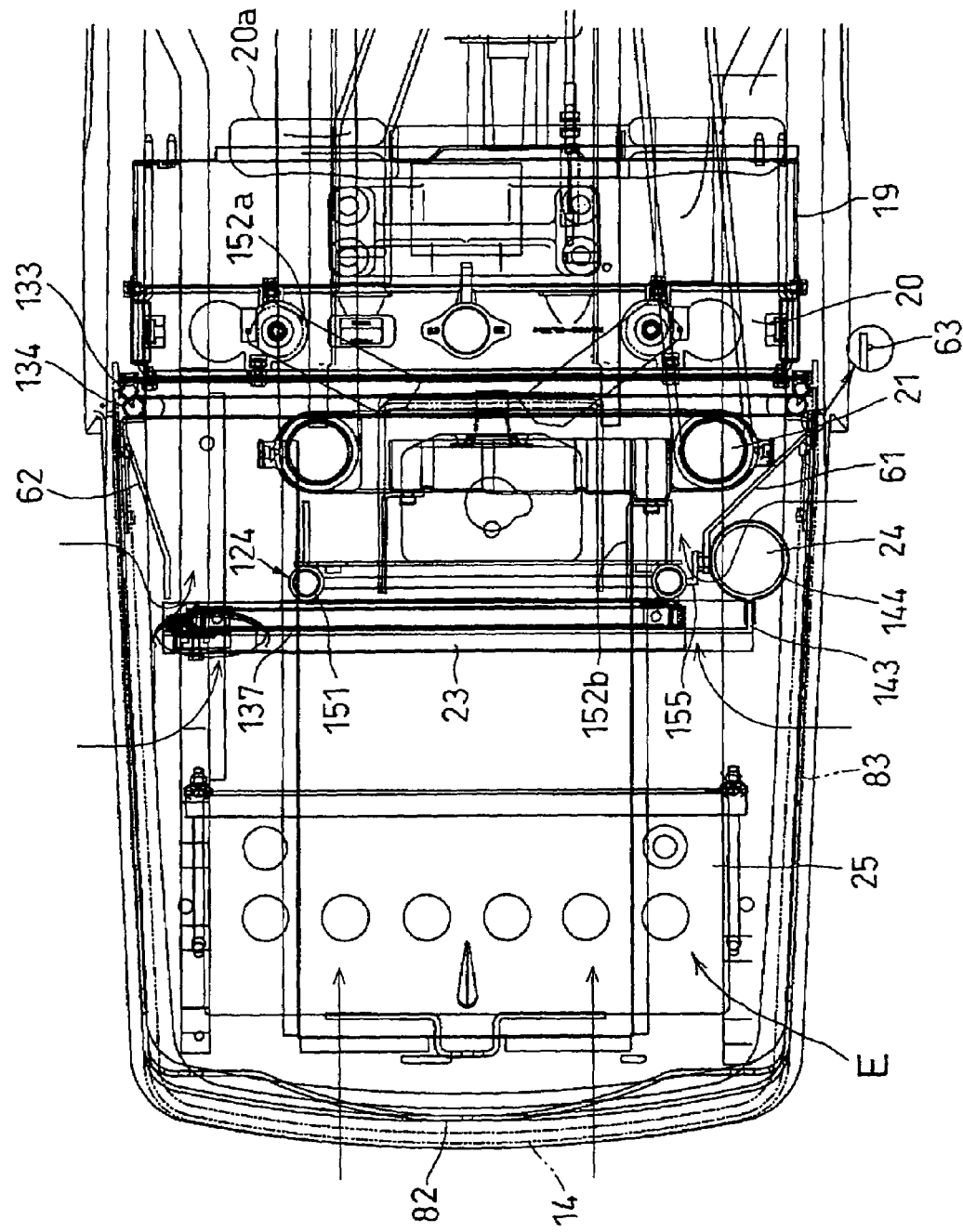
FIG. 27 is a plan view showing an inner arrangement of the hood relating to the fourth embodiment.
Figure 28:
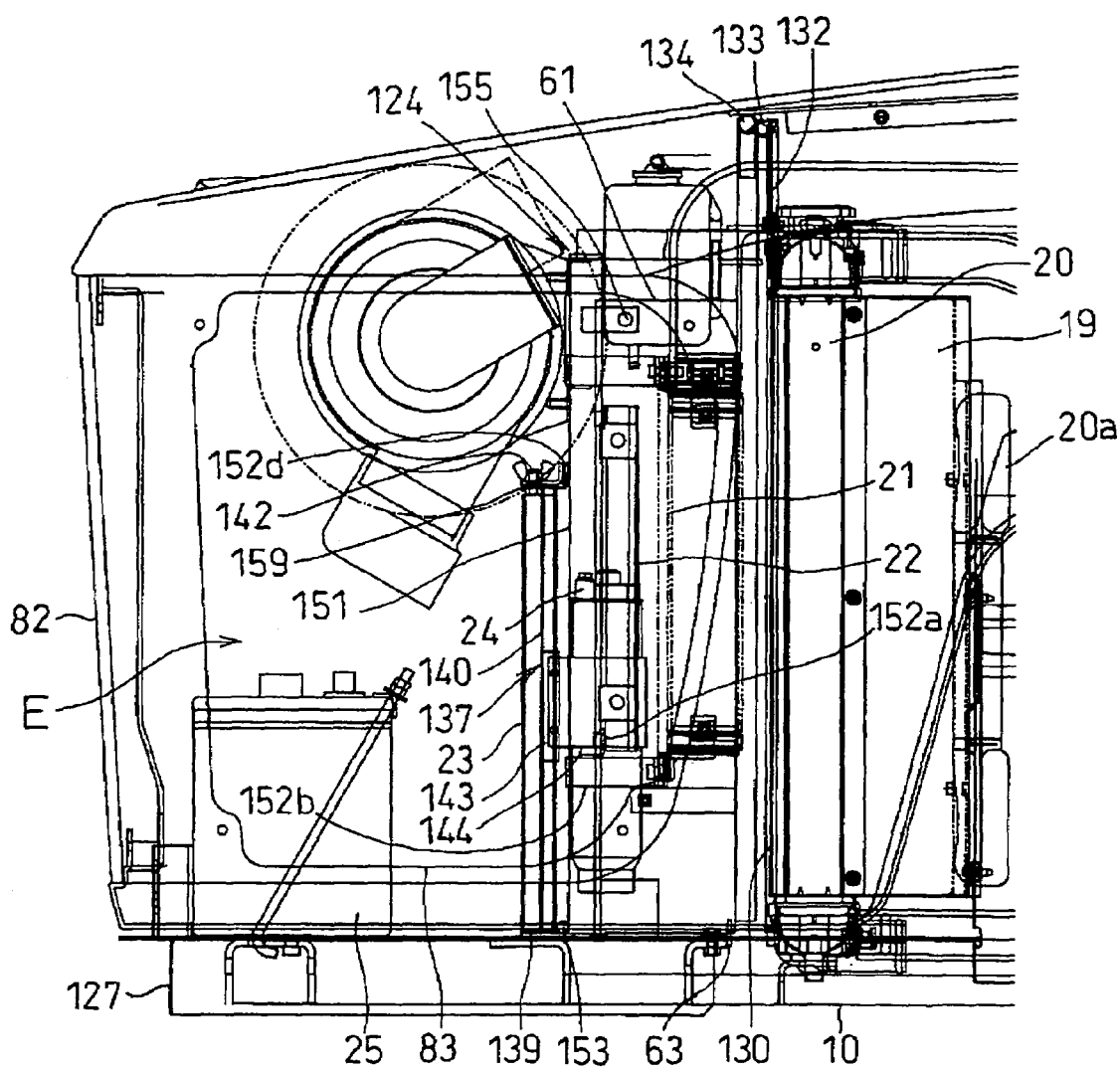
FIG. 28 is a left side view showing the inner arrangement of the hood relating to the fourth embodiment.
Figure 29:
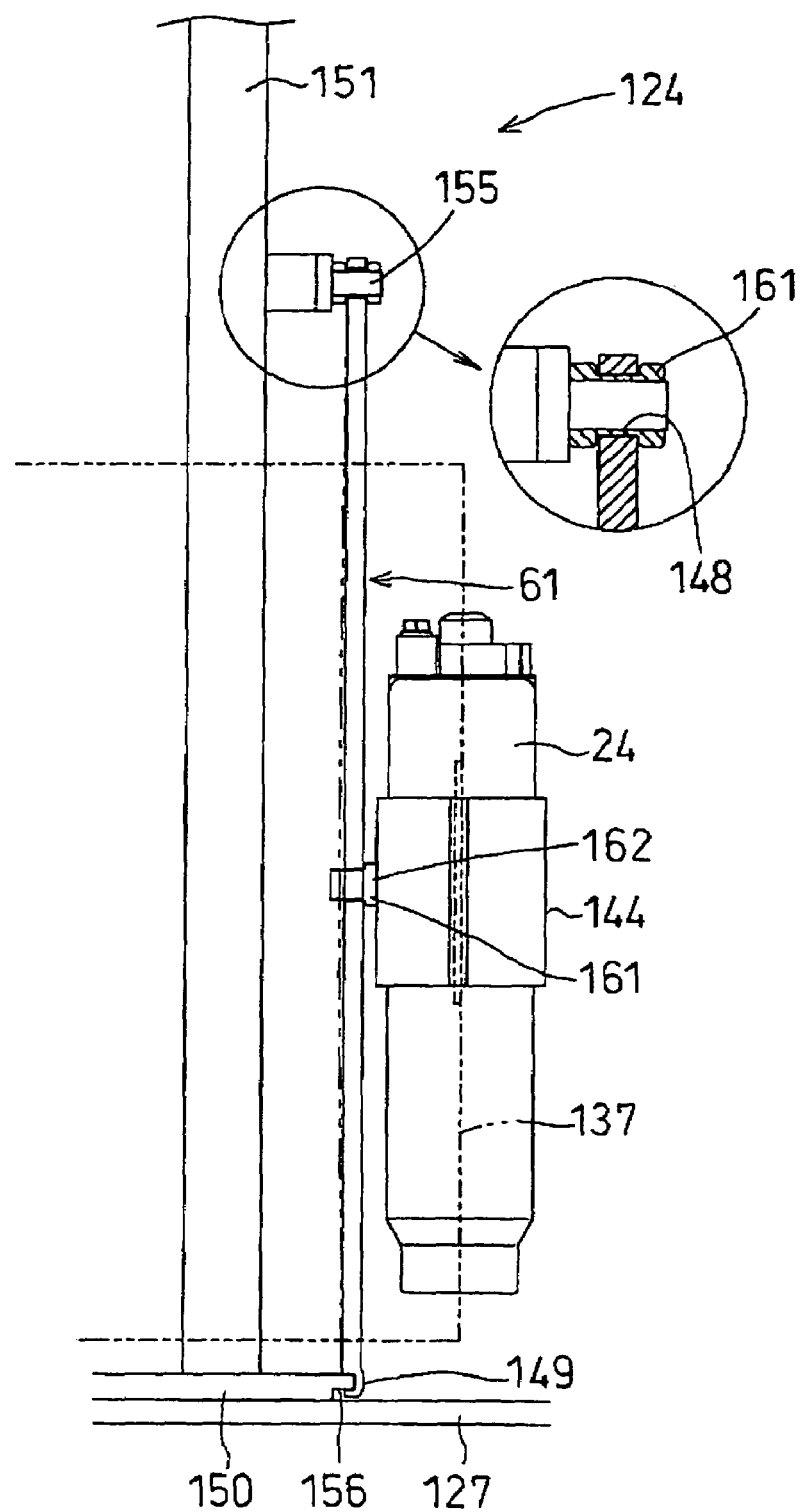
FIG. 29 is a schematic front view showing vicinity of a receiver in the fourth embodiment.

Further, as shown in FIG. 25, in this embodiment, the disposing pitch (the number of air vent holes per unit area) of the air vent holes 102 of the side faces of the hood 14 is set smaller than the disposing pitch of the air vent holes 101 of the front face of the hood 14 and also the disposing pitch of the air vent holes 101 of the front lower end of the hood 14. In addition, the air vent holes 102 of the side faces of the hood 14 are smaller than the air vent holes 101 of the front face of the hood 14 and the air vent holes 101 of the front lower end of the hood 14. With this, the velocities of the introduced ambient air from the right and left faces and the front face of the hood 14 are equated with each other.

In this third embodiment, as shown in FIG. 25 for example, the air vent holes 102 (corresponding to the second air vent holes) of the side grill member 83 are formed as round holes with a diameter of 0.75 mm, which is a half of the diameter: 1.5 mm of the air vent holes (corresponding to the first air vent holes) 101 of the front face and the front lower end of the hood 14, as shown in FIG. 22. In addition, the disposing pitch of the air vent holes 102 (corresponding to the second air vent holes) of the side grill members 83 is set at 2.3 mm which is larger than the disposing pitch 2.0 mm of the air vent holes 101 of the front face and the front lower end of the hood 14.

With this alternative construction too, it is possible to equate the velocities of the introduced ambient air from the right and left faces and the front face of the hood 14.

Fourth Embodiment

The baffle plates can also be modified as follows. In the following discussion, these modifications will be explained as fourth through seventh embodiments of the present invention.

Referring to FIGS. 26-29, the air cooling auxiliary units such as the intercooler 21, the oil cooler 22, the condenser 23, the receiver 24, etc. are mounted on the front axle frame 10 by the support frame 124 provided forwardly of the radiator 20 and are disposed forwardly of the rear ends of the side grill members 83. The front axle frame 10 includes an attaching plate 127 for attaching an attaching frame 124, the battery 25 provided forwardly of the support frame 124, etc. The radiator 20 is disposed forwardly of the engine 5 (see FIG. 1), so that this radiator 20 is constructed as a front suction type adapted for introducing air from the front side and sending this air as cooling air to the engine 5 disposed rearward. The lower portion of this radiator 20 is secured to the front axle frame 10.

To the front face of the radiator 20, there is attached a rectangular insect net 130 so as to cover this front face. The net 130 is detachably attached via fasteners such as bolts. Further, the radiator 20 includes, at front upper portion thereof, an attaching member 132 which includes a sealing member 133. This sealing member 133 is engaged with a portal frame 16 provided forwardly thereof and attached to the hood 14. The sealing member 133 seals between the portal frame 16 and the radiator 20, so that the air sent by the radiator fan 20a toward the engine 6 will not return to the front side of the radiator 20 to be introduced into the radiator 20 again.

The condenser 23 is disposed forwardly of the support frame 124 and includes a condenser body 51 attached to a frame member 53. The front face of this condenser body 41 is covered with a net 52.

The frame member 53 is formed as a portal frame in its front view by raising a pair of right and left erect pieces 140 from a rectangular lower piece 139 placed on the support frame 124 and then connecting the upper ends of these erect pieces 140 by an upper piece 141. On one right/left side of the upper piece 141, there is formed a threaded portion 142 projecting upward.

The erect pieces 140 form receiver attaching portions 143 for attaching the receiver 24. Hence, by attaching a cylindrical receiver attaching member 144 via a fastener, the receiver 24 is supported at a rear portion of the condenser 23.

Between the support frame 124 and the radiator 20 in the fore and aft direction and also on the right and left sides of the radiator 20, there are provided a pair of right and left baffle plates 61, 62 for closing the right and left sides of the front side of the radiator 20, thereby to regulate introduction of air from the sides of the radiator 20. Each baffle plate is formed by bending a plate-like member. The front portion of each baffle plate is located on the right/left outer side of the support frame 30 and bent outward in the right/left direction as extending from its fore and aft intermediate portion toward the radiator 20. The rear portion of each baffle plate is located forwardly of the radiator 20 and on the outer side of the right/left side of the radiator 20 to be closer to the radiator 20.

For the left baffle plate 61, at its rear lower portion (the lower end on the side of the radiator), there is provided a pivot pin 63 (vertical shaft). As this pivot pin 63 is inserted to the attaching plate 12 of the front axle frame 10, the rear portion of the baffle plate 61 is pivotally supported about the vertical axis, so that the lateral side space can be freely opened/closed. On the other than, for the right baffle plate 62, its rear portion is secured to the attaching plate 12, the portal frame 16, etc. So that, this plate cannot be opened/closed in the right/left direction.

In the support frame 124, a pair of right and left support posts 151 are provided erect from a plate-like base portion 150 attached to the attaching plate 12 and the support posts 151 include a plurality of attaching portions for attachment of the respective air cooling auxiliary units such as the radiator 20. Further, on the attaching plate 12 of the support frame 124, there is provided a bar-like contact portion 153 for coming into contact with the rear portion of the condenser 23.

At a front upper portion of the baffle plate 61, there is provided an upper engaged portion 148 for engagement with the support frame 124. This upper engaged portion 148 is formed as an insertion hole into which an upper engaging portion 155 provided in the support frame 124 is to be inserted. More particularly, the upper engaging portion 155 provided on one right/left side of the support post 151 of the support frame 124 is formed as a projection which projects from a vertical intermediate portion of the support post 151 and is bent rearward at an intermediate portion thereof and then projects from this bent portion to a right/left outer side.

At the front lower portion of the baffle plate 61, there is provided a lower engaged portion 149 for engagement with the support frame 124. This lower engaged portion 149 is formed as an engaging projection for engagement with a lower engaging portion 156 bent from a lower portion of the baffle plate 61 to a right/left inner side and provided in the support frame 124. More particularly, this lower engaging portion 156 provided in the base member 150 is formed as an engaging recess into which the lower engaged portion 149 of the baffle plate 61 is to be inserted.

A radiator attaching portion 152a provided in the support frame 124 and used for attachment of the upper portion of the radiator 20 is provided at the upper end of the support post 161. This radiator attaching portion 152a projects rearward and extends into two parts in the right/left direction at the rear portion thereof and to this rear portion, the upper end of the radiator 20 is attached.

A pair of upper and lower intercooler attaching portions 152b provided in the support frame 124 for attachment of upper and lower portions of the intercooler 21 are located downwardly of the radiator attaching portion 152a. The intercooler attaching portions 152b are provided in a pair of upper and lower connecting bars 158 configured for interconnecting vertical intermediate portions of the support posts 151 in the right/left direction. The intercooler attaching portions 152b project rearward from the connecting bars 158 and support the intercooler 21 forwardly of the radiator 20. Though not shown, an attaching portion for the oil cooler 22 also projects rearward from the connecting bar 158 and supports the oil cooler 22 to the support posts 151 forwardly of the intercooler 21.

A condenser attaching portion 152d provided in the support frame 124 for attachment of the upper portion of the condenser 23 is provided between the pair of upper and lower connecting bars 158. On one right/left side of this condenser attaching portion 152d, there is provided a bracket 159 against which the upper piece 141 of the attaching frame 137 comes into abutment from the lower side thereof. This bracket 159 is located on the right/left outer side of the support posts 151 and projects forwardly. At the right/left side of the bracket 159, there is provided an inserting portion into which the threaded portion 142 provided in the upper piece 141 of the condenser 23 can be inserted from the right/left outer side.

With the above-described construction, the lower piece 139 of the attaching frame 137 will be placed on the front portion of the attaching plate 127 and the rear portion of the lower piece 139 will be placed into contact with the contact portion 153 of the support frame 124. Further, the threaded portion 142 of the upper piece 141 will be inserted into the inserting portion of the bracket 159 from the right/left outer side and then this threaded portion 142 will be fastened by means of a butterfly nut provided at its upper end. With this, the condenser 23 is attached to the support frame 124. Further, by loosening the butterfly nut, the attaching frame 137 can be drawn out to the right/left one side, so that the condenser 23 and the receiver 24 can be drawn out of the hood 14.

When the receiver 24 is attached to the support frame 124 through this attaching frame 137, the receiver attaching member 144 to which the receiver 24 is attached is located on the outer side of the support posts 151 and located also forwardly of the baffle plate 61, thereby to press this baffle plate 61 from the right/left outer side to the right/left inner side. At this pressed portion where the baffle plate 61 is pressed (between the baffle plate 61 and the receiver attaching member 144), there is provided a cushion member 161 formed of e.g. rubber.

In an outer peripheral face of the receiver attaching member 144, there is formed a pressing portion 162 for pressing a vertical intermediate portion of the baffle plate 61 from the right/left outer side.

According to the above-described construction, when the baffle plate 61 is closed, the upper and lower engaged portions 148, 149 of the baffle plate 61 are engaged and retained at the upper engaging portion 155 and the lower engaging portion 156 of the support frame 124, and the inner side of the baffle plate 61 is placed in contact with the support frame 124. And, by sliding the attaching frame 137 from the outer side to the inner side to be attached to the support frame 124, the front portion of the baffle plate 61 can be pressed from the outer side by the pressing portion 162 of the receiver 24. In this, as the front portion of the baffle plate 61 is pressed, this front portion is slightly flexed to the inner side. Hence, vibration of the baffle plate 61 can be restricted.

Further, since the pair of right and left baffle plates 61, 62 for closing the opposing right and left lateral sides forwardly of the radiator 20 are provided, the flow of air introduced to the radiator 20 from the right and left sides between the support frame 124 and the radiator 20 can be regulated by these baffle plates 61, 62, and air can be introduced smoothly from the front side of the radiator 20. The air coming in from the right and left sides between the support frame 124 and the radiator 20 to enter the radiator 20 will collide the baffle plates 61, 62 and will be reduced in its velocity, so that the air will flow forwardly of the pair of right and left baffle plates 61, 62, detouring to the front side of the condenser 23.

Accordingly, the air introduced for the lateral sides of the radiator 20 will be introduced into the radiator 20 from its front side, so that this air can cool the air cooling auxiliary units such as the intercooler 21, the oil cooler 22, the condenser 23, etc. in an efficient manner.

Further, as air introduction from the lateral sides of the radiator 20 is regulated, the velocity of the air introduced from the side grill members 83 provided on the lateral sides of the hood is reduced. For this reason, the possibility of earlier clogging of the side grill members 83 with foreign objects such as bugs, dust or the like can be reduced advantageously.

Moreover, as one of the baffle plates 61 is adapted to be freely opened/closed, by setting the baffle plate 61 to its opened posture, maintenance of the oil cooler 22 and the intercooler 21 can be easily carried out. In addition, replacement or maintenance of the insect net 130 provided forwardly of the radiator 20 can be easily carried out as well.

Fifth Embodiment

Figure 30:
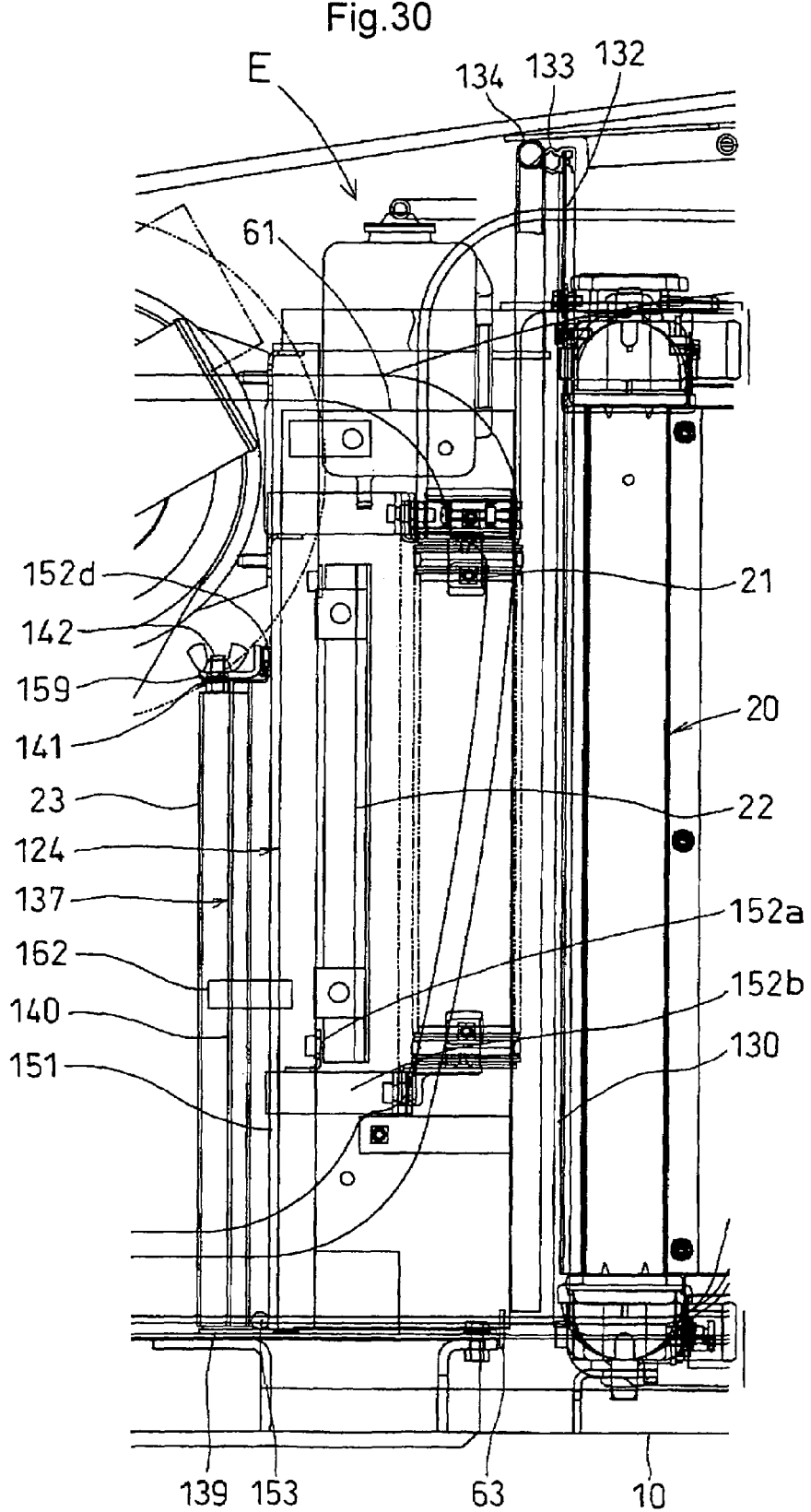
FIG. 30 shows a fifth embodiment of the invention and is a left side view showing the inside of the hood.
Figure 31:
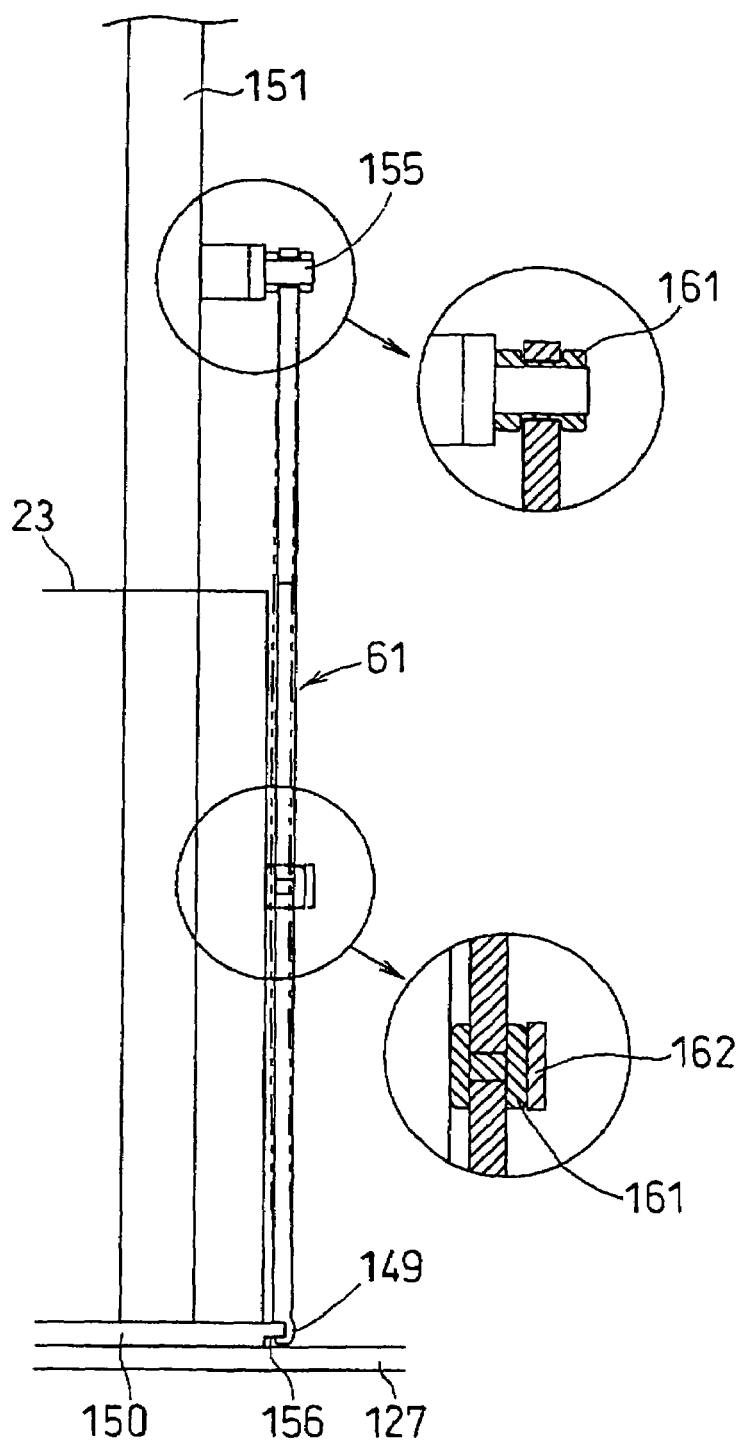
FIG. 31 is a schematic front view of the left side of a condenser in the fifth embodiment.

A fifth embodiment shown in FIGS. 30-31 differs from the second embodiment in that the pressing portion 162 provided in the receiver 24 in the second embodiment is now provided in the front-most air cooling auxiliary unit (e.g. the condenser 23).

This pressing portion 162 is provided at one right/left side of the condenser 23 and projects rearward from the condenser 23 and also extends to the front side of the baffle plate 61. The leading end of this pressing portion 162 is located on the outer side of the cushion member 161 provided at a vertical intermediate portion forwardly of the baffle plate 61.

Therefore, with the baffle plate 61 being opened in the right/left direction, the attaching frame 137 of the condenser 23 will be inserted into the support frame 124 from the outer side and then the attaching frame 137 will be slid to the inner side in the right/left direction while closing the baffle plate 61, so that the vertical intermediate portion of the baffle plate 61 can be pressed by the pressing portion 162 provided in the condenser 23.

According to this embodiment, when the condenser 23 is attached to the support frame 124, the vertical intermediate portion of the baffle plate 61 can be pressed from the outer side in the right/left direction, thereby to flex the baffle plate 61. With this, vibration noise of the baffle plate 61 can be reduced.

Incidentally, it is preferred that the vertical intermediate portion of the baffle plate 162 be pressed by the pressing portion 162 provided in the condenser 23.

Sixth Embodiment

Figure 32:
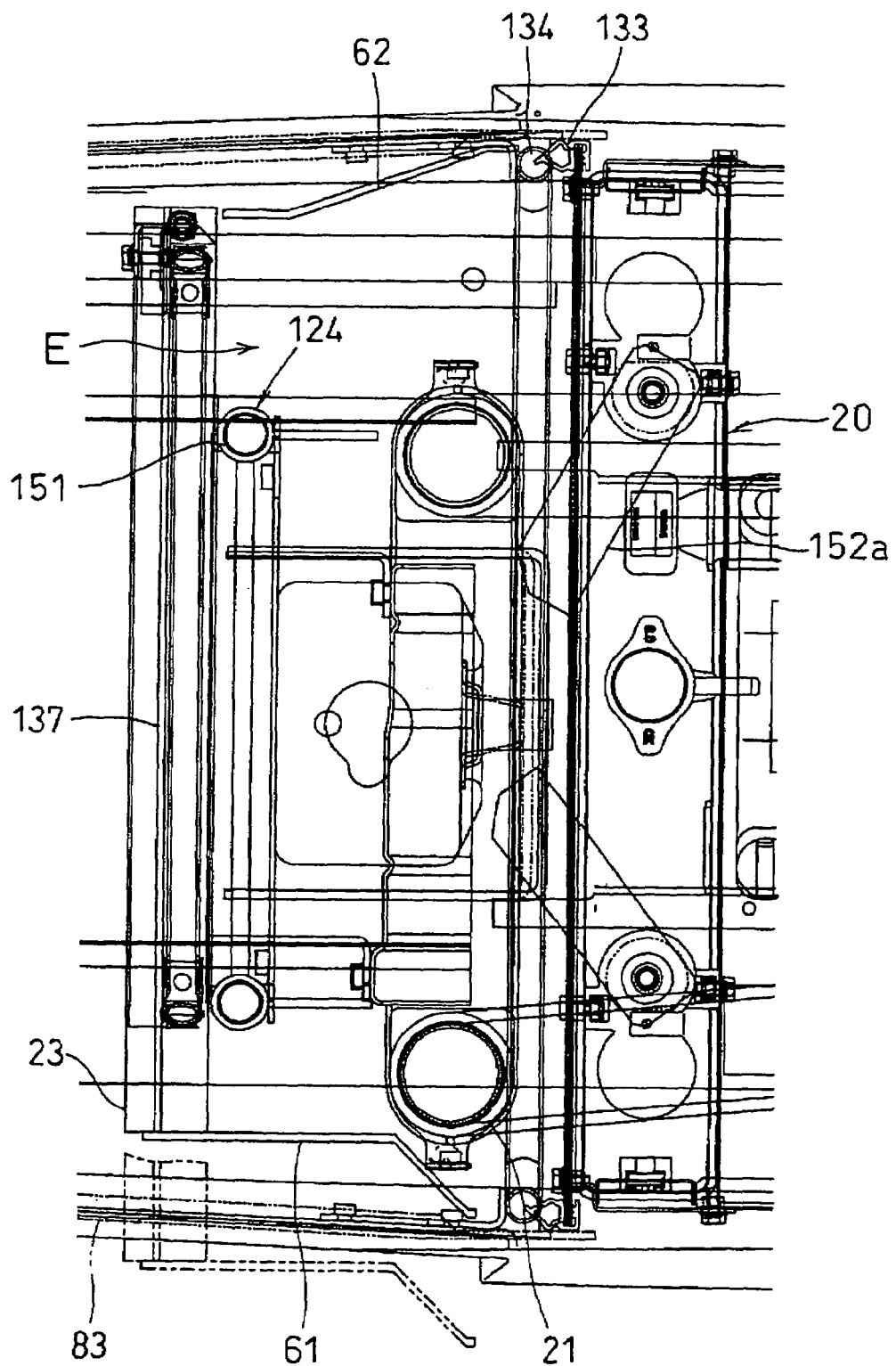
FIG. 32 shows a sixth embodiment of the present invention and is a plan view showing the side of the hood.

In a sixth embodiment shown in FIG. 32, unlike the foregoing embodiment in which one 61 of the pair of right and left baffle plates is pivotally attached to the front axle frame 10 to be freely opened/closed, the front portions of this one baffle plate 61 is attached to an air cooling auxiliary unit (e.g. the condenser 23) which per se can be drawn out in the right/left direction and the rear portion of this baffle plate 61 is not fixed to the radiator 20 or to the front axle frame 10, but configured as a free end to be located close to the radiator 20.

Therefore, the baffle plate 61 can be drawn out by drawing out the attaching frame 137 of the condenser 23 from the support frame 124 to the right/left outer side. With this, by sliding the baffle plate 61 together with the condenser 23, maintenance of the oil cooler 22 and the intercooler 21 can be easily carried out.

Seventh Embodiment

Figure 33:
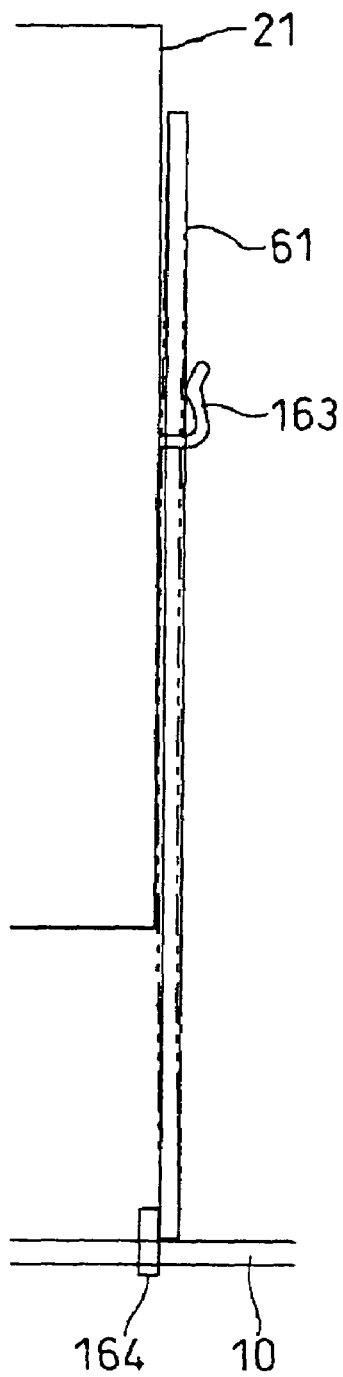
FIG. 33 shows a seventh embodiment of the present invention and is a view showing a modification of a baffle plate.

In the fourth and fifth embodiments described above, the baffle plate 61 is pressed from the outer side when the condenser 23, the receiver 24, etc. is attached. Instead, as shown in FIG. 33, a spring 163 (e.g. a plate spring) can be provided at one right/left side of the intercooler 21, with a projecting portion of this spring 163 being caused to extend through the baffle plate 61, so that an outer end of the spring 163 comes into contact with the baffle plate 61 from the outer side. With this, the baffle plate 61 is pressed from the right/left outer side by the urging force of the spring 163.

Further, in the foregoing embodiments, the lower inner side of the baffle plate 61 is placed in contact with the support frame 124. Instead, as shown in FIG. 33, a pin 164 or the like can be caused to project upward from the front axle frame 10, so that the lower inner side of the baffle plate 61 may come into contact with this pin 164.

Eighth Embodiment

Like the right baffle plate 62 in the first embodiment, the left baffle plate 61 too can be adapted to be pivotable.

Figure 34:
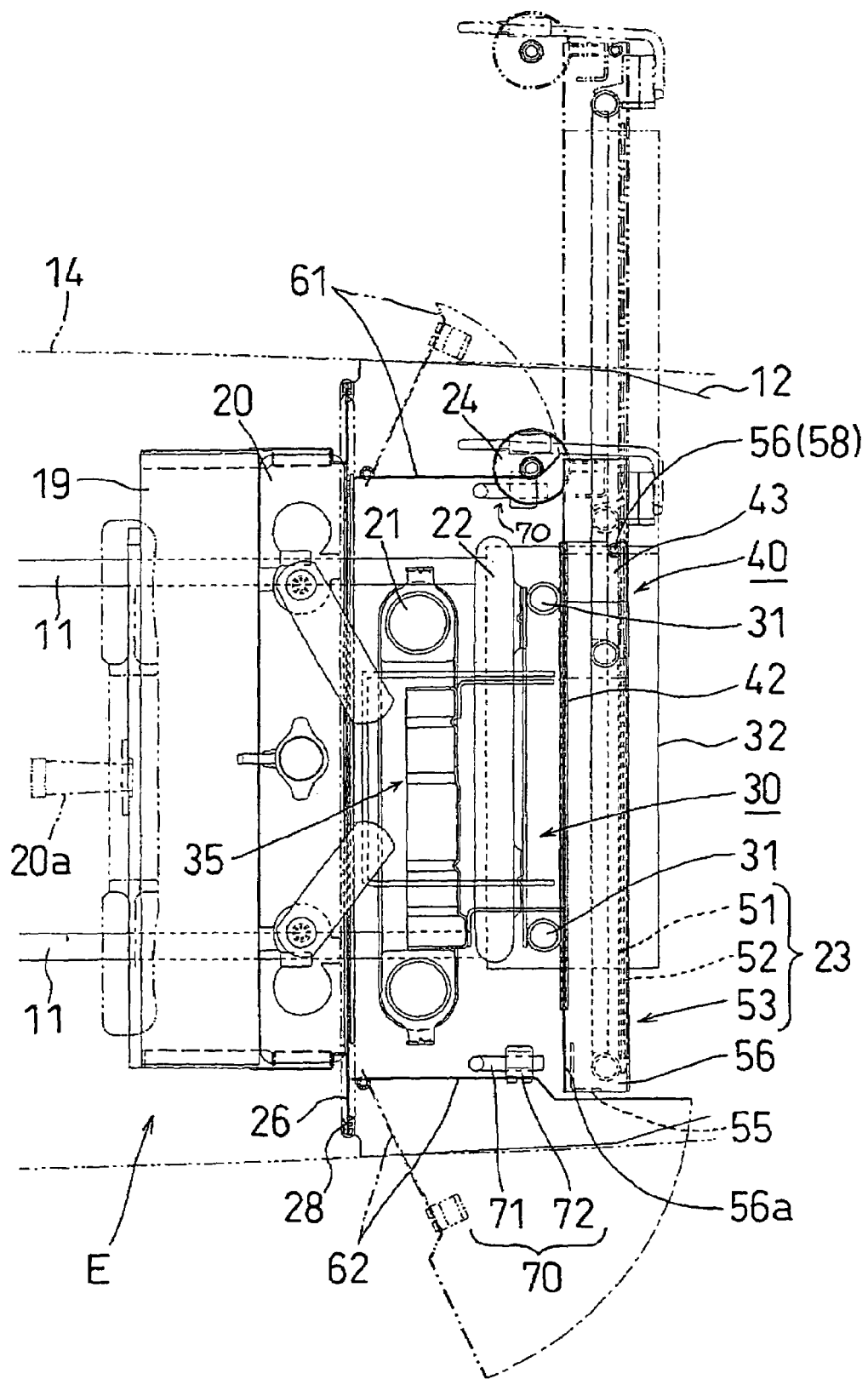
FIG. 34 shows an eighth embodiment of the present invention and is a plan view showing the inside of the hood.

For instance, as shown in FIG. 34, in this embodiment, the rear end of the baffle plate 61 is pivotable about a vertical axis in the vicinity of the partitioning frame 26. And, between the baffle plate 61 and the front axle frame 10, there is provided a closed position fixing means 70 for supporting the baffle plate 61 at its closed posture.

Incidentally, the front end edge of this baffle plate 61 under its closed posture is in opposition to the rear face of the condenser 23.

In this embodiment, like the embodiment described above, after drawing out the condenser 23, the left baffle plate 61 can be pivoted from the closed posture to the opened posture. Hence, in the case of this construction too, when maintenance or checking of the engine room E is to be carried out, the opposed lateral sides and the front side of the intercooler 21 and the oil cooler 22 can be exposed.

Other Embodiments

The present invention is not limited to the foregoing embodiments, but can be modified as follows.

(1) It is possible to cause the disposing density of the air vent holes (the number of the air vent holes per unit area) to gradually decrease from the front face to the lateral faces of the hood 14. And/or, it is possible to cause the size of the air vent holes to gradually decrease from the front face to the lateral faces of the hood 14.

(2) In the foregoing embodiments, the respective constructions include the front grill member 82 provided to the front face of the hood 14, the pair of right and left grill members 83 provided to the right and left faces of the hood 14, and the lower grill member 84 provided to the lower side of the hood 14. Instead, the construction can eliminate the lower grill member 84, so that for the hood 14, there are provided only the front grill member 82 and the pair of right and left grill members 83. Hence, the ambient air will be drawn into the hood 14 only through the air vent holes 101 of the front grill member 82 and the air vent holes 102 of the right and left side grill members 83.

(3) In the foregoing embodiments, the front grill member 82 provided to the front face of the hood 14 and the side grill members 83 provided to the right and left side faces of the hood 14 are provided as separate members. Instead, a single grill member may be provided to extend from the front face to the right and left side faces of the hood 14, with the disposing density of the air vent holes 102 on the lateral sides of this grill member being smaller than the disposing density of the air vent holes 101 of the front face thereof or the size of the air vent holes 102 on the lateral sides being smaller than the size of the air vent holes 101 on the front side. With this alternative construction too, it is possible to equate the velocities of the ambient air drawn in respectively from the right and left sides and the front side of the hood 14.

(4) In the foregoing embodiments, there are provided the pair of right and left baffle plates 61, 62 for regulating the introduction of ambient air from the lateral sides of the hood 14. The invention may be embodied without these baffle plates 61, 62. In this case, by differing the arrangements or sizes of the air vent holes 101 on the right and left sides of the hood 14 and the air vent holes 101 on the front side thereof, it is possible to equate the velocities of the ambient air drawn in respectively from the right and left sides and the front side of the hood 14.

(5) In the foregoing embodiments, the air vent holes 102 on the right and left sides of the hood 14 and the air vent holes 101 on the front side thereof are formed as round holes. Instead, these vent holes 101, 102 may be angular holes such as square, triangular holes.

(6) Further, in the foregoing embodiments, the vertical inner side of the baffle plate 61 is placed in contact with the support frame 124, and the outer side of its vertically intermediate portion is pressed by e.g. an air cooling auxiliary unit. Instead, the vertical inner side of the detachable baffle plate may be placed in contact with the support frame 124 and the outer side of its vertical intermediate portion is pressed by e.g. an air cooling auxiliary unit.

(7) In the foregoing embodiments, the openable/closable baffle plate is supported to be openable/closable by pivotally attaching its rear lower portion about a vertical axis (pivot pin 63). Instead, the rear upper or lower portion of this baffle plate may be pivotally attached about the vertical shaft. Further, this vertical shaft may be provided in the radiator 20 or any other component.

(8) In the first embodiment, the left baffle plate 61 is adapted to be drawn out of the engine room E in the right/left direction of the vehicle body. Instead, the right baffle plate 62 can be adapted to be drawn out. Or, both of these baffle plates 61, 62 may be adapted to be drawn out.

(9) In all of the foregoing embodiments, the baffle plates are the flat plate-like baffle plates 61, 62. The invention is not limited thereto. For instance, the baffle plates may be corrugated plate-like members or partial cylindrical members, or members of any other desired shape. Further, these baffle plates too can include air vent holes of a smaller diameter than those formed in the grill members.

(10) The condenser 23 may be adapted to be drawn out of the engine room E to the right side, and in correspondence therewith, the right baffle plate 62 may be attached to the condenser 23 and the left baffle plate 61 may be pivotally supported. And, the closed position fixing means 70 may be disposed between the left baffle plate 61 and the front axle frame 10.

(11) In the respective foregoing embodiments shown in the figures, the three air cooling auxiliary units, i.e. the intercooler 21, the oil cooler 22 and the condenser 23 are arranged in series in the mentioned order from the side of the radiator 20. These three air cooling auxiliary units may be arranged in series in any other order forwardly of the radiator 20 as long as the lateral sides between the opposing faces of the air cooling auxiliary unit disposed at the first position in the order and the radiator 20 are closed by the pair of right and left baffle plates 61, 62.

The present invention may be embodied in any other manner than described above. Various modifications thereof will be apparent for those skilled in the art without departing from the essential concept thereof defined in the appended claims.

The invention claimed is:

1. A work vehicle comprising:
   a traveling vehicle body;
   a hood provided at a front portion of the vehicle body for covering an engine room, the hood including a front face having a plurality of first air vent holes and right and left side faces each having a plurality of second air vent holes, to define the first and second air vent holes continuously with each other, ambient air being drawn in through the first and second air vent holes;
   a radiator mounted inside the hood;
   a condenser disposed forwardly of the radiator; and
   a pair of baffle members disposed inside the hood and extending along right and left side faces of the radiator, respectively, and between the radiator and the condenser;
   wherein the condenser, the radiator and the pair of baffle members define a communication space, and the ambient air, having been drawn in through the second vent holes, flows along the pair of baffle members and then flows to the radiator through the condenser and the communication space.

2. The work vehicle according to claim 1, wherein the first air vent holes are formed in a first grill member attached to the front face and the second air vent holes are formed in a second grill member attached to each side face.

3. The work vehicle according to claim 1, wherein one of the pair of baffle members can be drawn out in a right/left direction of the vehicle body.

4. A work vehicle comprising:
a traveling vehicle body;
a hood provided at a front portion of the vehicle body for covering an engine room, the hood including a front face having a plurality of first air vent holes and right and left side faces each having a plurality of second air vent holes, to define the first and second air vent holes continuously with each other, ambient air being drawn in through the first and second air vent holes;
a radiator mounted inside the hood;
a condenser disposed forwardly of the radiator; and
a pair of baffle members disposed inside the hood and extending along right and left side faces of the radiator, respectively;
wherein one of the pair of baffle members is attached to a front axle frame of the traveling vehicle body to be pivotally opened and closed about a vertical axis; and
wherein the condenser can be drawn out in a right and left direction of the vehicle body, and attaching the other of the pair of baffle members allows the other baffle member to be drawn out in the right and left direction together with the condenser.

5. The work vehicle according to claim 4, wherein the first air vent holes are formed in a first grill member attached to the front face and the second air vent holes are formed in a second grill member attached to each side face.

6. A work vehicle comprising:
a traveling vehicle body;
a hood provided at a front portion of the vehicle body for covering an engine room, the hood including a front face having a plurality of first air vent holes and right and left side faces each having a plurality of second air vent holes, to define the first and second air vent holes continuously with each other;
a radiator mounted inside the hood, ambient air being drawn in through the first and second air vent holes toward the radiator; and
a pair of baffle members disposed inside the hood and extending along right and left side faces of the radiator, respectively;
wherein at least one of the pair of baffle members is attached to a front axle frame of the traveling vehicle body to be pivotally opened and closed about a vertical axis
wherein at least one air cooling auxiliary unit is disposed adjacent to a front face of the radiator, and the air cooling auxiliary unit includes a pressing portion for pressing, from the outside, a vertically intermediate portion of a free end of the movable baffle members.

7. The work vehicle according to claim 6, wherein the first air vent holes are formed in a first grill member attached to the front face and the second air vent holes are formed in a second grill member attached to each side face.

8. The work vehicle according to claim 6, wherein at least one air cooling auxiliary unit is disposed adjacent a front face of the radiator, and the pair of the baffle members direct the ambient air drawn in from the right and left side faces of the radiator toward the air cooling auxiliary unit.

9. The work vehicle according to claim 6, wherein between the movable baffle member and the front axle frame, there is provided a closed position fixing means for supporting the front end of the movable baffle member at its closed position.

10. The work vehicle according to claim 6, wherein the other of the pair of baffle members can be drawn out in a right and left direction of the vehicle body.

11. The work vehicle according to claim 9, wherein said closed position fixing means includes an engaging member projecting upwardly of the front axle frame and a clip member provided in the baffle member and engageable with the engaging member.

* * * * *

UNITED STATES PATENT AND TRADEMARK OFFICE
CERTIFICATE OF CORRECTION

PATENT NO. : 7,575,081 B2 Page 1 of 1
APPLICATION NO. : 10/944435
DATED : August 18, 2009
INVENTOR(S) : Obe et al.

It is certified that error appears in the above-identified patent and that said Letters Patent is hereby corrected as shown below:

On the Title Page, See Item (56) References Cited, U.S. PATENT DOCUMENTS, add the following:
-- 4,086,976     05/1978     Holm et al. .................180/68.1 --

Signed and Sealed this

Sixteenth Day of November, 2010

David J. Kappos
*Director of the United States Patent and Trademark Office*